(12) United States Patent
Borden et al.

(10) Patent No.: US 11,281,668 B1
(45) Date of Patent: Mar. 22, 2022

(54) OPTIMIZING COMPLEX DATABASE QUERIES USING QUERY FUSION

(71) Applicant: Tableau Software, LLC, Seattle, WA (US)

(72) Inventors: Nicolas Ratigan Borden, Seattle, WA (US); Justin Talbot, Seattle, WA (US); Christian Gabriel Eubank, Seattle, WA (US)

(73) Assignee: TABLEAU SOFTWARE, LLC, Seattle, WA (US)

( * ) Notice: Subject to any disclaimer, the term of this patent is extended or adjusted under 35 U.S.C. 154(b) by 71 days.

(21) Appl. No.: 16/905,819

(22) Filed: Jun. 18, 2020

(51) Int. Cl.
  *G06F 16/245* (2019.01)
  *G06F 16/2453* (2019.01)
  *G06F 16/242* (2019.01)
  *G06F 16/2455* (2019.01)

(52) U.S. Cl.
  CPC ...... *G06F 16/24535* (2019.01); *G06F 16/244* (2019.01); *G06F 16/2445* (2019.01); *G06F 16/2456* (2019.01)

(58) Field of Classification Search
  None
  See application file for complete search history.

(56) References Cited

U.S. PATENT DOCUMENTS

| | | | |
|---|---|---|---|
| 5,511,186 A | 4/1996 | Carhart et al. | |
| 5,917,492 A | 6/1999 | Bereiter et al. | |
| 6,167,399 A * | 12/2000 | Hoang | G06F 16/2237 |
| 6,189,004 B1 | 2/2001 | Rassen et al. | |
| 6,199,063 B1 | 3/2001 | Colby et al. | |
| 6,212,524 B1 | 4/2001 | Weissman et al. | |
| 6,385,604 B1 | 5/2002 | Bakalash et al. | |
| 6,492,989 B1 | 12/2002 | Wilkinson | |
| 6,532,471 B1 | 3/2003 | Ku et al. | |
| 6,807,539 B2 | 10/2004 | Miller et al. | |
| 7,023,453 B2 | 4/2006 | Wilkinson | |
| 7,039,650 B2 | 5/2006 | Adams et al. | |

(Continued)

OTHER PUBLICATIONS

Eubank, Office Action, U.S. Appl. No. 16/579,762, dated Feb. 19, 2021, 9 pgs.

(Continued)

*Primary Examiner* — Son T Hoang
(74) *Attorney, Agent, or Firm* — Morgan, Lewis & Bockius LLP

(57) ABSTRACT

A database engine receives a query batch of database queries from a client. The database engine identifies one or more object model queries from the query batch. Each object model query includes an outer-most outer-join that joins a respective dimension subquery and respective aggregated measure subqueries. The database engine forms a plurality of candidate subqueries by peeling off the respective outer-most outer-join for each of the object model queries. The database engine then fuses at least some of the plurality of candidate subqueries to form a set of optimized subqueries. The set of optimized subqueries has fewer subqueries than the plurality of candidate queries. The database engine also forms an optimized execution plan based on the set of one or more optimized subqueries. The database engine subsequently obtains a result set from the database based on the optimized execution plan, and returns the result set to the client.

19 Claims, 16 Drawing Sheets

(56) References Cited

U.S. PATENT DOCUMENTS

| | | |
|---|---|---|
| 7,176,924 B2 | 2/2007 | Wilkinson |
| 7,290,007 B2 | 10/2007 | Farber et al. |
| 7,302,447 B2 | 11/2007 | Dettinger et al. |
| 7,337,163 B1 | 2/2008 | Srinivasan et al. |
| 7,426,520 B2 | 9/2008 | Gorelik et al. |
| 7,800,613 B2 | 9/2010 | Hanrahan et al. |
| 7,941,521 B1 | 5/2011 | Petrov et al. |
| 7,945,562 B2* | 5/2011 | Ahmed ............. G06F 16/24544 707/718 |
| 8,082,243 B2 | 12/2011 | Gorelik et al. |
| 8,442,999 B2 | 5/2013 | Gorelik et al. |
| 8,874,613 B2 | 10/2014 | Gorelik et al. |
| 9,165,029 B2 | 10/2015 | Bhoovaraghavan et al. |
| 9,336,253 B2 | 5/2016 | Gorelik et al. |
| 9,563,674 B2 | 2/2017 | Hou et al. |
| 9,633,076 B1* | 4/2017 | Morton ................. G06F 16/248 |
| 9,710,527 B1 | 7/2017 | Sherman |
| 9,779,150 B1 | 10/2017 | Sherman et al. |
| 2001/0054034 A1 | 12/2001 | Arning et al. |
| 2002/0055939 A1 | 5/2002 | Nardone et al. |
| 2002/0116357 A1* | 8/2002 | Paulley ............. G06F 16/24544 |
| 2003/0004959 A1 | 1/2003 | Kotsis et al. |
| 2003/0023608 A1 | 1/2003 | Egilsson et al. |
| 2004/0103088 A1 | 5/2004 | Cragun et al. |
| 2004/0122844 A1 | 6/2004 | Malloy et al. |
| 2004/0139061 A1 | 7/2004 | Colosi et al. |
| 2004/0243593 A1 | 12/2004 | Stolte et al. |
| 2005/0038767 A1 | 2/2005 | Verschell et al. |
| 2005/0060300 A1 | 3/2005 | Stolte et al. |
| 2005/0182703 A1 | 8/2005 | D'hers et al. |
| 2006/0010143 A1 | 1/2006 | Netz et al. |
| 2006/0167865 A1* | 7/2006 | Andrei ............. G06F 16/24544 |
| 2006/0167924 A1 | 7/2006 | Bradlee et al. |
| 2006/0173813 A1 | 8/2006 | Zorola |
| 2006/0206512 A1 | 9/2006 | Hanrahan et al. |
| 2006/0294081 A1 | 12/2006 | Dettinger et al. |
| 2006/0294129 A1 | 12/2006 | Stanfill et al. |
| 2007/0006139 A1 | 1/2007 | Rubin |
| 2007/0156734 A1 | 7/2007 | Dipper et al. |
| 2008/0016026 A1 | 1/2008 | Farber et al. |
| 2008/0027957 A1 | 1/2008 | Bruckner et al. |
| 2008/0154841 A1* | 6/2008 | Reichart ........... G06F 16/24537 |
| 2009/0006370 A1 | 1/2009 | Li et al. |
| 2009/0319548 A1 | 12/2009 | Brown et al. |
| 2010/0005054 A1 | 1/2010 | Smith et al. |
| 2010/0005114 A1 | 1/2010 | Dipper |
| 2010/0077340 A1 | 3/2010 | French et al. |
| 2011/0055199 A1* | 3/2011 | Siddiqui ............. G06F 16/2456 707/714 |
| 2011/0131250 A1 | 6/2011 | Stolte et al. |
| 2012/0116850 A1 | 5/2012 | Abe et al. |
| 2012/0117453 A1 | 5/2012 | Mackinlay et al. |
| 2012/0191698 A1* | 7/2012 | Albrecht ............. G06F 16/2453 707/718 |
| 2012/0284670 A1 | 11/2012 | Kashik et al. |
| 2013/0080584 A1 | 3/2013 | Benson |
| 2013/0159307 A1 | 6/2013 | Wolge et al. |
| 2013/0166498 A1 | 6/2013 | Aski et al. |
| 2013/0191418 A1 | 7/2013 | Martin, Jr. et al. |
| 2014/0181151 A1 | 6/2014 | Mazoue |
| 2014/0189553 A1 | 7/2014 | Bleizeffer et al. |
| 2015/0039912 A1 | 2/2015 | Payton et al. |
| 2015/0261728 A1 | 9/2015 | Davis |
| 2015/0278371 A1 | 10/2015 | Anand et al. |
| 2016/0092530 A1 | 3/2016 | Jakubiak et al. |
| 2016/0092601 A1 | 3/2016 | Lamas et al. |
| 2017/0132277 A1 | 5/2017 | Hsiao et al. |
| 2017/0357693 A1 | 12/2017 | Kumar et al. |
| 2018/0024981 A1 | 1/2018 | Xia et al. |
| 2018/0129513 A1 | 5/2018 | Gloystein et al. |
| 2018/0336223 A1 | 11/2018 | Kapoor et al. |
| 2019/0026337 A1* | 1/2019 | Aksman ............ G06F 16/24535 |
| 2019/0065565 A1 | 2/2019 | Stolte et al. |
| 2019/0108272 A1* | 4/2019 | Talbot .................. G06F 16/248 |
| 2020/0073876 A1 | 3/2020 | Lopez et al. |
| 2020/0125559 A1 | 4/2020 | Talbot et al. |
| 2020/0233905 A1 | 7/2020 | Williams et al. |

OTHER PUBLICATIONS

Eubank, Office Action, U.S. Appl. No. 16/570,969, dated Jun. 15, 2021, 12 pgs.

Eubank, Notice of Allowance, U.S. Appl. No. 16/579,762, dated Aug. 18, 2021, 15 pgs.

Ganapavurapu, "Designing and Implementing a Data Warehouse Using Dimensional Modling," Thesis Dec. 7, 2014, XP055513055, retrieved from Internet: UEL:https://digitalepository.unm.edu/cgi/viewcontent.cgi?article= 1091&context-ece_etds, 87 pgs.

Gyldenege, Preinterview First Office Action, U.S. Appl. No. 16/221,413, dated Jun. 11, 2020, 4 pgs.

Gyldenege, First Action Interview Office Action, U.S. Appl. No. 16/221,413, dated Jul. 27, 2020, 4 pgs.

Mansmann, "Extending the OLAP Technology to Handle Non-Conventional and Complex Data," Sep. 29, 2008, XP055513939, retrieve from URL/https://kops.uni-konstanz.de/hadle/123456789/5891, 1 pg.

Milligan et al., (Tableau 10 Complete Reference, Copyright © 2018 Packt Publishing Ltd., ISBN 978-1-78995-708-2, Electronic edition excerpts retrieved on [Sep. 23, 2020] from [https://learning.orelly.com/], 144 pages (Year: 2018).

"Mondrian 3.0.4 Technical Guide," 2009 (Year: 2009).

Morton, Office Action, U.S. Appl. No. 14/054,803, dated Sep. 11, 2015, 22 pgs.

Morton, Final Office Action, U.S. Pat. No. 14054803, dated May 11, 2016, 22 pgs.

Morton, Notice of Allowance, U.S. Appl. No. 14/054,803, dated Mar. 1, 2017, 23 pgs.

Morton, Preinterview 1st Office Action, U.S. Appl. No. 15/497,130, dated Sep. 18, 2019, 6 pgs.

Morton, First Action Interview Office Action, U.S. Appl. No. 15/497,130, dated Feb. 19, 2020, 26 pgs.

Morton, Final Office Action, U.S. Appl. No. 15/497,130, dated Aug. 12, 2020, 19 pgs.

Sleeper, Ryan (Practical Tableau, Copyright © 2018 Evolytics and Ryan Sleeper, Published by OP'Reilly Media, Inc., ISBN 978-1-491-97731-6, Electronic editionexcerpts retrieved on [Sep. 23, 2020] from [https://learning.oreilly.com/], 101 pages, (Year: 2018).

Morton, Office Action, U.S. Appl. No. 15/497,130, dated Jan. 8, 2021, 20 pgs.

Song et al., "SAMSTAR," Data Warehousing and OLAP, ACM, 2 Penn Plaza, Suite 701, New York, NY, Nov. 9, 2007, XP058133701, pp. 9 to 16, 8 pgs.

Tableau Software, Inc., International Search Report and Written Opinion, PCTUS2019056491, dated Jan. 2, 2020, 11 pgs.

Tableau Software, Inc., International Search Report and Written Opinion, PCTUS2018/044878, dated Oct. 22, 2018, 15 pgs.

Tableau Software, Inc., International Preliminary Report on Patentability, PCTUS2018/044878, dated Apr. 14, 2020, 12 pgs.

Tableau Software, Inc., International Search Report and Written Opinion, PCT/US2020/045461, dated Oct. 28, 2020.

Tableau All Releases, retrieved on [Oct. 2, 2020] from [https://www.tableau.com/products/all-features], (Year: 2020], 49 pgs.

Talbot, Office Action, U.S. Appl. No. 14/801,750, dated May 7, 2018, 60 pgs.

Talbot, Final Office Action, U.S. Appl. No. 14/801,750, dated Nov. 28, 2018, 63 pgs.

Talbot, Office Action, U.S. Appl. No. 14/801,750, dated Jun. 24, 2019, 55 pgs.

Talbot, Final Office Action, U.S. Appl. No. 15/911,026, dated Dec. 16, 2020, 28 pgs.

Talbot, Preinterview First Office Action, U.S. Appl. No. 16/236,611, dated Oct. 28, 2020, 6 pgs.

Talbot, First Action Interview Office Action, U.S. Appl. No. 16/236,611, dated Dec. 22, 2020, 5 pgs.

Talbot, Final Office Action, U.S. Appl. No. 16/236,611, dated Apr. 27, 2021, 21 pgs.

(56) References Cited

OTHER PUBLICATIONS

Talbot, Office Action, U.S. Appl. No. 16/236,611, dated Oct. 4, 2021, 18 pgs.
Talbot, Preinterview First Office Action, U.S. Appl. No. 16/236,612, dated Oct. 29, 2020, 6 pgs.
Talbot, First Action Interview Office Action, U.S. Appl. No. 16/236,612, dated Dec. 22, 2020, 5 pgs.
Talbot, Final Office Action, U.S. Appl. No. 16/236,612, dated Apr. 28, 2021, 20 pgs.
Talbot, Office Action, U.S. Appl. No. 16/236,612, dated Oct. 5, 2021, 22 pgs.
Trishla Maru, "Running Analytics on SAP HANA and BW with MicroStrategy," Dec. 25, 2016, XP055738162, from https://silo.tips/download/running-analytics-on-san-hana-and-bw-with-microstrategy, xx pgs.
Weir, Office Action, U.S. Appl. No. 16/572,506, dated Dec. 11, 2020, 19 pgs.
Weir, Office Action, U.S. Appl. No. 16/679,233, dated Oct. 1, 2020, 9 pgs.
Weir, Notice of Allowance, U.S. Appl. No. 16/679,233, dated Jan. 11, 2021, 8 pgs.

\* cited by examiner

| Query | Sub-query |
|---|---|
| [Ship Mode] for query 1 | SELECT "Orders"."Ship Mode" AS "Ship Mode"<br>FROM "Orders"<br>GROUP BY 1 |
| SUM([Sales]) for query 1 | SELECT "t0"."Ship Mode" AS "Ship Mode",<br>  SUM("LineItems"."Sales") AS "sum:Sales:ok"<br>FROM "LineItems"<br>  INNER JOIN (<br>SELECT "LineItems"."Order ID" AS "Order ID",<br>  "Orders"."Ship Mode" AS "Ship Mode"<br>FROM LineItems"<br>  LEFT JOIN "Orders" ON ("LineItems"."Order ID" = "Orders"."Order ID")<br>GROUP BY 1,<br>  2<br>) "t0" ON ("LineItems"."Order ID" IS NOT DISTINCT FROM "t0"."Order ID")<br>GROUP BY 1 |
| [Ship Mode] for query 2 | SELECT "Orders"."Ship Mode" AS "Ship Mode"<br>FROM "Orders"<br>GROUP BY 1 |
| SUM([Profit]) for query 2 | SELECT "t0"."Ship Mode" AS "Ship Mode",<br>  SUM("LineItems"."Profit") AS "sum:Profit:ok"<br>FROM "LineItems"<br>  INNER JOIN (<br>SELECT "LineItems"."Order ID" AS "Order ID",<br>  "Orders"."Ship Mode" AS "Ship Mode"<br>FROM "LineItems"<br>  LEFT JOIN "Orders" ON ("LineItems"."Order ID" = "Orders"."Order ID")<br>GROUP BY 1,<br>  2<br>) "t0" ON ("LineItems"."Order ID" IS NOT DISTINCT FROM "t0"."Order ID")<br>GROUP BY 1 |

Figure 5A

| Query | Sub-query | Note |
|---|---|---|
| [Ship Mode] | SELECT "Orders"."Ship Mode" AS "Ship Mode"<br>FROM "Orders"<br>GROUP BY 1<br><u>514</u> | Two identical [Ship Mode] queries fuse together. |
| SUM([Sales])<br>⊕<br>SUM([Profit]) | SELECT "t0"."Ship Mode" AS "Ship Mode",<br>SUM( "LineItems"."Profit" ) AS "sum:Profit:ok",<br>SUM( "LineItems"."Sales" ) AS "sum:Sales:ok"<br>FROM "LineItems"<br>INNER JOIN (<br>SELECT "LineItems"."Order ID" AS "Order ID",<br>"Orders"."Ship Mode" AS "Ship Mode"<br>FROM "LineItems"<br>LEFT JOIN "Orders" ON ( "LineItems"."Order ID" = "Orders"."Order ID" )<br>GROUP BY 1,<br>2<br><u>516</u><br>) "t0" ON ( "LineItems"."Order ID" IS NOT DISTINCT FROM "t0"."Order ID" )<br>GROUP BY 1 | Two aggregate measures at the same LOD from the same table fuse together. |

Figure 5B

624 — In accordance with a determination that a first candidate subquery and a second candidate subquery are aggregated measure subqueries at the same level of detail from a first object of the database, form an optimized subquery based on the first candidate subquery and adding references to columns of the first object from the second candidate subquery. Discard the second candidate subquery.

Figure 6C

626 — Combine groups of queries defined over the same relation and potentially different with respect to their top-level projection lists.

Figure 6D

OPTIMIZING COMPLEX DATABASE QUERIES USING QUERY FUSION

RELATED APPLICATIONS

This application is related to U.S. patent application Ser. No. 16/570,969, filed Sep. 13, 2019, entitled "Utilizing Appropriate Measure Aggregation for Generating Data Visualizations of Multi-fact Datasets," which is incorporated by reference herein in its entirety.

This application is also related to U.S. patent application Ser. No. 16/231,302, filed Dec. 21, 2018, entitled "Elimination of Query Fragment Duplication in Complex Database Queries," which is incorporated by reference herein in its entirety.

TECHNICAL FIELD

The disclosed implementations relate generally to relational database systems, more specifically to system features that improve query execution performance for database queries have a certain structure.

BACKGROUND

A database engine receives queries, and retrieves data from one or more database tables to provide the data requested by the query. A database query is expressed in a specific query language, such as SQL. In general, a database query specifies the desired data without specifying a detailed execution plan about how to retrieve the data. For example, in SQL, the query includes a SELECT clause, a FROM clause, and a WHERE clause, which specify the data columns desired, the tables that include the desired columns, and conditions on how the data is selected. SQL queries may also contain a GROUP By clause, a HAVING clause, and/or an ORDER BY clause. It is up to the database engine to parse each query, build an execution plan, and execute the plan to retrieve the requested results. This gives the database engine substantial flexibility. However, different execution plans for the same query can have enormously different execution times to retrieve the results. For example, one execution plan may retrieve the results in less than a second, whereas a second plan may take minutes to retrieve exactly the same results. To address this issue, database engines typically include one or more optimization layers to improve execution performance. Unfortunately, existing database engines have difficulty optimizing certain types of complex queries.

Data visualization applications enable a user to understand a data set visually, including distribution, trends, outliers, and other factors that are important to making business decisions. Some data elements are computed based on data from the selected data set. For example, data visualizations frequently use sums to aggregate data. Some data visualization applications enable a user to specify a "Level of Detail" (LOD), which can be used for the aggregate calculations. However, specifying a single Level of Detail for a data visualization is insufficient to build certain calculations. Similarly, a single Level of Detail may not be sufficient when aggregating fields from different database tables.

Some data visualization applications provide a user interface that enables users to build visualizations from a data source by selecting data fields and placing them into specific user interface regions to indirectly define a data visualization. See, for example, U.S. patent application Ser. No. 10/453,834, filed Jun. 2, 2003, entitled "Computer Systems and Methods for the Query and Visualization of Multidimensional Databases," now U.S. Pat. No. 7,089,266, which is incorporated by reference herein in its entirety. However, when there are complex data sources and/or multiple data sources, it may be unclear what type of data visualization to generate (if any) based on a user's selections.

SUMMARY

Generating a data visualization that combines data from multiple tables can be challenging, especially when there are multiple fact tables. In some cases, it can help to construct an object model of the data before generating data visualizations. In some instances, one person is a particular expert on the data, and that person creates the object model. By storing the relationships in an object model, a data visualization application can leverage that information to assist all users who access the data, even if they are not experts.

An object is a collection of named attributes. An object often corresponds to a real-world object, event, or concept, such as a Store. The attributes are descriptions of the object that are conceptually at a 1:1 relationship with the object. Thus, a Store object may have a single [Manager Name] or [Employee Count] associated with it. At a physical level, an object is often stored as a row in a relational table, or as an object in JSON.

A class is a collection of objects that share the same attributes. It must be analytically meaningful to compare objects within a class and to aggregate over them. At a physical level, a class is often stored as a relational table, or as an array of objects in JSON.

An object model is a set of classes and a set of many-to-one relationships between them. Classes that are related by 1-to-1 relationships are conceptually treated as a single class, even if they are meaningfully distinct to a user. In addition, classes that are related by 1-to-1 relationships may be presented as distinct classes in the data visualization user interface. Many-to-many relationships are conceptually split into two many-to-one relationships by adding an associative table capturing the relationship, according to some implementations. Some implementations do not add an associative table. In some implementations, an associative or "bridge" table is used to represent possible combinations of join keys for two tables.

Once an object model is constructed, a data visualization application can assist a user in various ways. In some implementations, based on data fields already selected and placed onto shelves in the user interface, the data visualization application can recommend additional fields or limit what actions can be taken to prevent unusable combinations. In some implementations, the data visualization application allows a user considerable freedom in selecting fields, and uses the object model to build one or more data visualizations according to what the user has selected.

When an SQL query is received by a database engine, the query is parsed and translated into an abstract syntax tree. Semantic analysis turns the syntax tree into an operator tree. Building the operator tree combines the syntax tree with schema information, resolves table and column names, and resolves internal references within the query. During logical optimization, the database engine applies constant folding, predicate pushdown, and join reordering, as well as other optimization techniques. The database engine described herein is able to optimize complex database queries (e.g., object model queries) through query fusion.

An object model query has a specific structure because it is generated for a data visualization application using an object model. Each object model query is based on a dimension query at an appropriate level of detail as well as one or more aggregated measure queries, each of which aggregates a measure at the appropriate level of detail. These queries are combined by an outer join between the dimension query and each of the aggregated measure queries.

Object model queries are described in more detail in U.S. patent application Ser. No. 16/579,762, filed Sep. 23, 2019, entitled "Join Key Recovery and Functional Dependency Analysis to Generate Database Queries" and U.S. patent application Ser. No. 16/570,969, filed Sep. 13, 2019, entitled "Utilizing Appropriate Measure Aggregation for Generating Data Visualizations of Multi-fact Datasets," each of which is incorporated by reference herein in its entirety.

A method is provided for enhancing real-time data exploration through optimization of complex database queries using query fusion. In accordance with some implementations, the method is performed at a database engine having one or more computing devices, each having one or more processors and memory. The memory stores one or more programs configured for execution by the one or more processors. The one or more programs execute to retrieve data from a database (e.g., an SQL database). The database engine receives a query batch of database queries from a client. The database engine identifies one or more object model queries from the query batch. For each object model query, the database engine peels off the outer-most outer-join that joins a respective dimension subquery and respective aggregated measure subqueries, thereby obtaining a plurality of candidate subqueries. The database engine fuses at least some of the plurality of candidate subqueries to obtain a set of optimized subqueries. This reduces the number of subqueries that will need to be executed. The database engine also forms an optimized execution plan based on the set of one or more optimized subqueries. The database engine subsequently obtains a result set from the database based on the optimized execution plan, and returns the result set to the client.

In some implementations, the query batch includes a first database query and a second database query, and the plurality of candidate subqueries includes a first subquery from the first database query and a second subquery from the second database query.

In some implementations, the database engine forms the optimized execution plan based on the set of one or more optimized subqueries by: for each object model query, applying an outer-most outer-join that joins a respective subset of subqueries of the set of one or more optimized subqueries. The respective subset of subqueries include subqueries that provide either the respective dimension subquery or the respective aggregated measure subqueries of the object model query.

In some implementations, fusing at least some of the plurality of candidate subqueries comprises, determining if a first candidate subquery and a second candidate subquery are identical or equivalent. In some implementations, the fusion process may insert additional states or rewrite joins. In such cases, the two candidate subqueries are said to be equivalent if the two subqueries can be answered by a common query which may be one of the candidate subqueries or a third query based on the constituent parts (i.e., the two subqueries).

In accordance with a determination that a first candidate subquery and a second candidate subquery are equivalent, the database engine forms an optimized subquery based on the first candidate subquery. In some implementations, determining if the first candidate subquery and the second candidate subquery are equivalent comprises determining if the first candidate subquery and the second candidate subquery reference the same object of the database. In some implementations, determining if the first candidate subquery and the second candidate subquery are equivalent comprises: parsing the plurality of candidate subqueries to build a respective query operator tree for each candidate subquery. Each query operator tree includes one or more query operators that reference objects of the database. Equivalence is established between the first candidate subquery and the second candidate subquery by traversing the respective query operator trees to determine equivalent query operators that reference the same objects of the database.

In some implementations, fusing at least some of the plurality of candidate subqueries comprises, when a first candidate subquery and a second candidate subquery are aggregated measure subqueries at the same level of detail from a first object of the database, forming an optimized subquery based on the first candidate subquery and adding references to columns of the first object from the second candidate subquery. The second candidate subquery is typically discarded, or converted to a reference to a cached calculation of the modified first candidate subquery.

In some implementations, fusing at least some of the plurality of candidate subqueries comprises combining groups of queries defined over the same relation, where the queries are potentially different with respect to their top-level projection lists (the final field names created by the queries). Some implementations use a projection list with top-level fields or renames. In some implementations, the "relation" is the rest of the query tree. To illustrate, suppose there are two subqueries: (i) "SELECT SUM(Foo) as M1 FROM Table" and (ii) "SELECT SUM(Foo) AS M2 FROM Table". These are two different queries, but they are structurally identical (the only difference is the names). Some implementations query the database for only one of these subqueries (e.g., the M1), and satisfy the second subquery by renaming M1 to M2.

In some implementations, prior to performing the fusing operation, the database engine rewrites the plurality of candidate subqueries to transform semantically identical but structurally distinct queries into normalized forms. In some implementations, the query normalization or rewriting process uses algorithms in a query pipeline. Some implementations recursively traverse the query tree. Some implementations perform local rewrites at various nodes of the query tree. For instance, some implementations perform constant folding, removing IFNULLs if a field cannot be null. Some implementations stop the recursive rewriting when the tree is traversed and cannot apply any rewrites at any node. In some implementations, prior to performing the fusing operation, the database engine applies a normalization technique that strips off top-level renames. An example of an object model query that includes one or more top-level renames is described above, according to some implementations. In some implementations, subqueries from different object model queries have different naming schemes. To further illustrate, consider a query "SELECT SUM(Foo) as F1, SUM(Foo) as F2 FROM Table". For this query, some implementations just issue the query "SELECT SUM(Foo) as F1" to the database. Some implementations rename F2 to F1 to indicate that F2 can be satisfied by F1. For this example, the rename stripping is performed inside a single subquery.

In some implementations, the database engine obtains the result set from the database by executing the optimized execution plan to retrieve the result set from the database.

In some implementations, the database engine caches results of executions of subqueries using a logical-query cache. When a result set for a query or subquery is stored in the logical-query cache, the database engine can optimize performance by reading from the cache rather then executing the same (or an equivalent) query multiple times. In some implementations, the caching uses query pipeline algorithms. In some implementations, there are a few levels of caching, which include caching on the final SQL string sent to the database and caching on the "Logical Query" intermediate language (e.g., intermediate language used by Tableau). In some implementations, the latter caching method has structural reasoning that allows it to get more hits. In some implementations, the database engine orders the one or more object model queries so as to increase hit rate for the logical-query cache. In some implementations, the re-ordering leverages query pipeline algorithms. To illustrate reordering, suppose there are two queries: (i) "SELECT [Sales] FROM Table" (which is disaggregated) and (ii) "SELECT SUM(Sales) AS M FROM Table" (which is aggregated). If the second query (ii) is issued first, then the first query (i) still needs to be issued to the database. This is because it is not possible to recover the disaggregated values from the aggregated sum. On the other hand, if the first query (i) is issued first, then the second query (ii) can be computed by grabbing the cached results from the first query (i) and applying the SUM locally.

In some implementations, the database engine parallel processes the set of one or more optimized subqueries in a query pipeline.

In some implementations, the database engine identifies each object model query by identifying a respective outer-most outer-join that joins a respective dimension subquery and respective aggregated measure subqueries.

In some implementations, the database engine identifies each object model query by parsing a database query to build a query operator tree that includes one or more query operators that reference objects of the database, and identifying an outer-most outer-join, from the one or more query operators, that joins a dimension subquery and aggregated measure subqueries.

In some implementations, the database engine is integrated with a data visualization engine to form a system (e.g., as parts of a server system). The data visualization engine constructs object model queries, and the database engine optimizes the object model queries. The data visualization engine receives a visual specification, which specifies a data source, a plurality of visual variables, and a plurality of data fields from the data source. Each of the visual variables is associated with either (i) a respective one or more of the data fields or (ii) one or more filters, and each of the data fields is identified as either a dimension or a measure. The data visualization engine obtains an object model encoding the data source as a tree of logical tables. Each logical table has its own physical representation and includes a respective one or more logical fields. Each logical field corresponds to either a data field or a calculation that spans one or more logical tables. Each edge of the tree connects two logical tables that are related. The data visualization engine forms a respective dimension subquery based on logical tables that supply the data fields for the dimensions and the filters. For each measure, the data visualization engine forms a respective aggregated measure subquery grouped by the dimensions, based on the logical tables that supply the data fields for the respective measure and the filters. The data visualization engine forms a respective outer-most outer-join, which joins, using the dimensions, the respective dimension subquery to the respective aggregated measure subqueries. These object model queries are passed to the database engine for optimization and execution.

In accordance with some implementations, a database engine includes one or more processors, memory, and one or more programs stored in the memory. The programs are configured for execution by the one or more processors. The programs include instructions for performing any of the methods described herein.

In accordance with some implementations, a non-transitory computer readable storage medium stores one or more programs configured for execution by a computer system having one or more processors and memory. The one or more programs include instructions for performing any of the methods described herein.

Thus methods, systems, and computer readable media are disclosed that provide more efficient processing by optimizing complex database queries using query fusion.

Both the foregoing general description and the following detailed description are exemplary and explanatory and are intended to provide further explanation of the invention as claimed.

BRIEF DESCRIPTION OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

FIGS. 5A and 5B show examples of optimization of object model queries using query fusion, according to some implementations.

FIGS. 6A-6K provide a flowchart of a process for optimizing object model queries using query fusion, according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
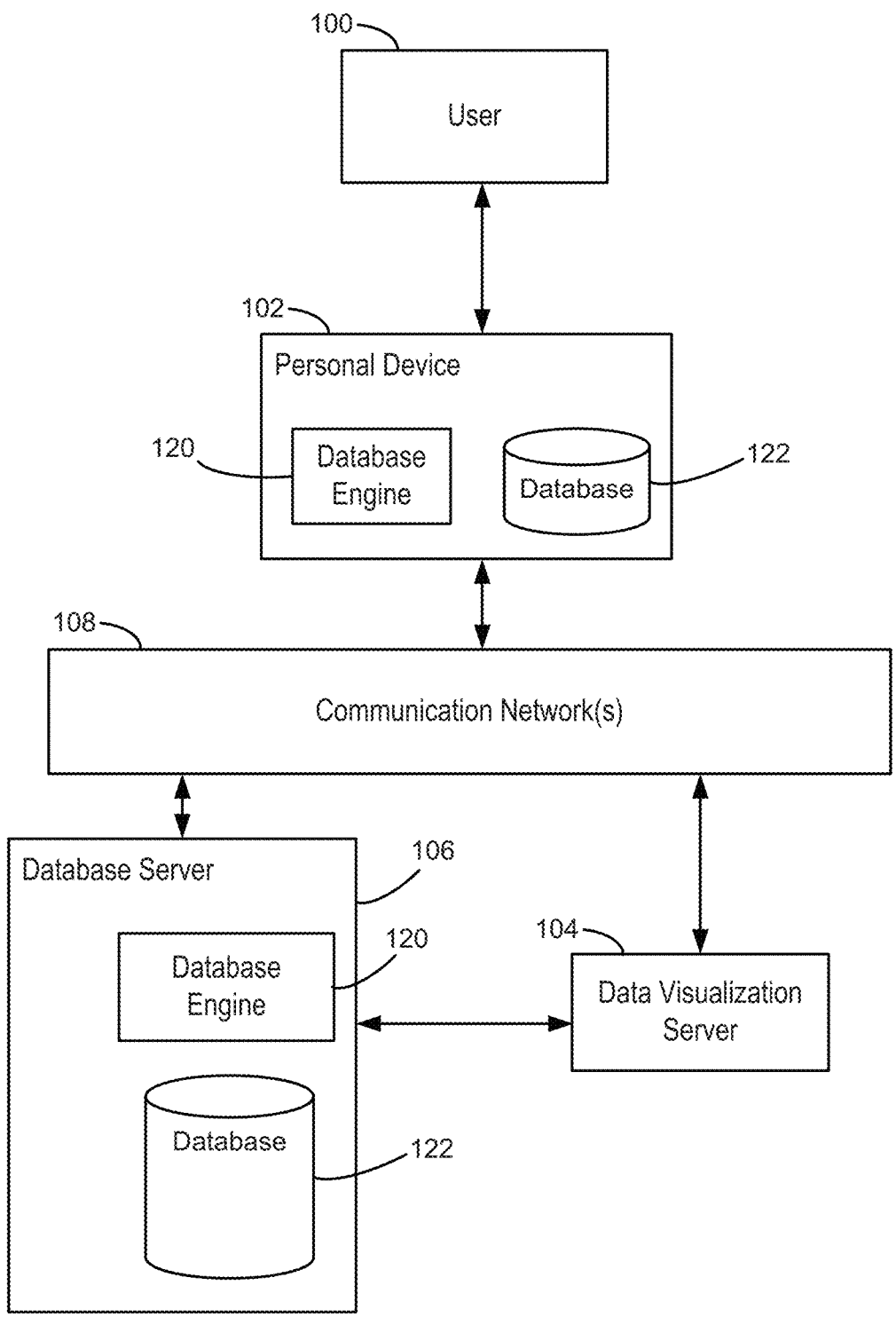
FIG. 1 illustrates the context for a database system in accordance with some implementations.

FIG. 1 illustrates a context in which some implementations operate. A user 100 interacts with a personal device 102, such as a desktop computer, a laptop computer, a tablet computer, or a mobile computing device. A personal device 102 is an example of a computing device 200. The term "computing device" also includes server computers, which may be significantly more powerful than a personal device used by a single user, and are generally accessed by a user only indirectly. An example computing device 200 is described below with respect to FIG. 2, including various software programs or modules that execute on the device 200. In some implementations, the personal device 102 includes one or more desktop data sources 224 (e.g., CSV files or spreadsheet files). In some implementations, the personal device 102 includes a database engine 120, which provides access to one or more relational databases 122 (e.g., SQL databases). In some implementations, the personal device includes a data visualization application 222, which the user 100 uses to create data visualizations from the desktop data sources 224 and/or the relational databases 122. In this way, some implementations enable a user to visualize data that is stored locally on the personal device 102.

In some cases, the personal device 102 connects over one or more communications networks 108 to one or more external database servers 106 and/or a data visualization server 104. The communication networks 108 may include local area networks and/or wide area networks, such as the Internet. In some implementations, the data visualization server 104 provides a data visualization web application that runs within a web browser 220 on the personal device 102. In some implementations, data visualization functionality is provided by both a local application 222 and certain functions provided by the data visualization server 104. For example, the data visualization server 104 may be used for resource intensive operations. In some implementations, the one or more database servers 106 include a database engine 120, which provides access to one or more databases 122 that are stored at the database server 106. As illustrated in FIG. 1, a database engine 120 and corresponding databases 122 may reside on either a local personal device 102 or on a database server 106. In some implementations (not illustrated here), the data visualization server 104 includes a database engine 120 and one or more databases 122 (sometimes called data sources).

Figure 2:
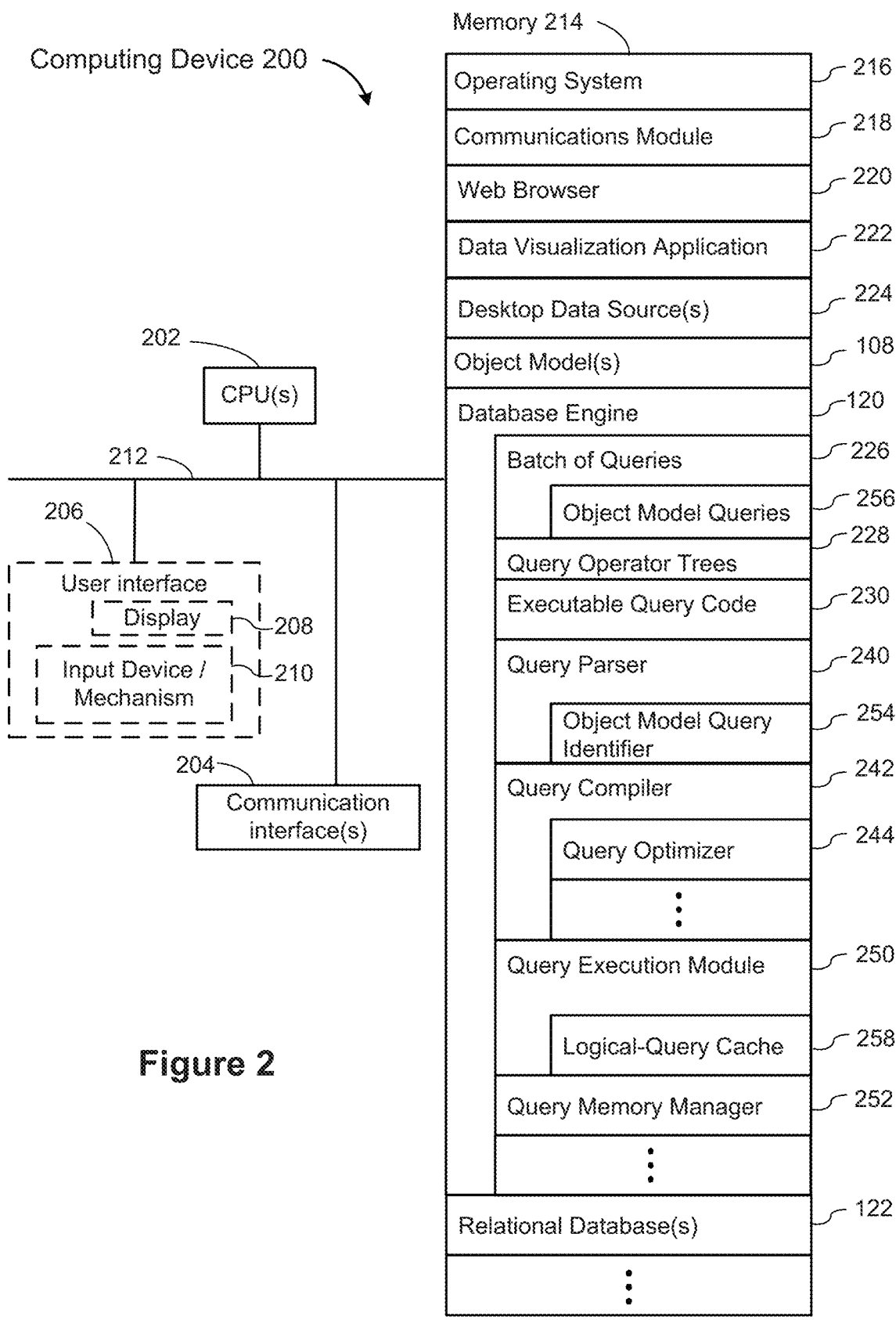
FIG. 2 is a block diagram of a computing device according to some implementations.

FIG. 2 is a block diagram illustrating a computing device 200 in accordance with some implementations. As used herein, the term "computing device" includes both personal devices 102 and servers, such as a database server 106 or a data visualization server 104. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 may include a user interface 206 comprising a display device 208 and one or more input devices or mechanisms 210. In some implementations, the input device/mechanism 210 includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display). In some implementations, the memory 214 includes high-speed random-access memory, such as DRAM, SRAM, DDR RAM, or other random access solid state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPU(s) 202. The memory 214, or alternatively the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks 108, such as the Internet, other wide area networks, local area networks, metropolitan area networks, and so on;
- a web browser 220 (or other client application), which enables a user 100 to communicate over a network with remote computers or devices. In some implementations, the web browser 220 executes a data visualization web application (not shown) downloaded from a data visualization server 104. In some implementations, a data visualization web application (not shown) is an alternative to storing a data visualization application 222 locally;
- a data visualization application 222, which enables users to construct data visualizations from various data sources. The data visualization application 222 retrieves data from one or more data sources, such as a desktop data source 224 (e.g., a CSV file or flat file), a relational database 122 stored locally, or a desktop data source or relational database 122 stored on another device (such as a database server 106). The data visualization application then generates and displays the retrieved information in one or more data visualizations;
- one or more desktop data sources 224, which have data that may be used and displayed by the data visualization application 222. Data sources 224 can be formatted in many different ways, such as spreadsheets, XML files, flat files, CSV files, text files, JSON files, or desktop database files. Typically, the desktop data sources 224 are used by other applications as well (e.g., a spreadsheet application);
- one or more object models 108, which identify the structure of the data sources 106. In an object model, the data fields (attributes) are organized into classes, where the attributes in each class have a one-to-one correspondence with each other. The object model also includes many-to-one relationships between the classes. In some instances, an object model maps each table within a database to a class, with many-to-one relationships between classes corresponding to foreign key relationships between the tables. In some instances, the data model of an underlying source does not cleanly map to an object model in this simple way, so the object model includes information that specifies how to transform the raw data into appropriate class objects. In some instances, the raw data source is a simple file (e.g., a spreadsheet), which is transformed into multiple classes;

a database engine 120, which receives batches of database queries 226 (e.g., queries from a data visualization application) and returns corresponding data. Query batches include one or more object model queries 256. The database engine 120 typically includes a plurality of executable modules;

the database engine 120 invokes a query parser 240, which parses each received query in the query batches 226 (e.g., SQL database query) to form a query operator tree 228. An operator tree is sometimes referred to as an algebra tree. In some implementations, the query parser 240 is contained within the query compiler 242. In some implementations, the query parser 240 includes an object model identifier module 254 that identifies (or selects) object model queries from the batch of queries 226. In some implementations, the object model identifier 254 is implemented as an independent module in the memory 214. Object model query identification is described below in reference to FIGS. 6A-6k, according to some implementations;

the database engine 120 includes a query compiler 242, which translates each query operator tree 228 into executable code 230. For brevity, the query compiler 242 is also referred to as the compiler. In some implementations, the compiler 242 includes an optimizer 244, which modifies a query operator tree 228 to produce a more efficient execution plan. The optimizer is generally capable of identifying multiple types of optimization based on the structure of the query operator tree and the data requested. For example, some implementations identify when to hoist subexpressions, such as a conditional subexpression, outside of a conditional expression. When the executable code is executed, a value is computed and saved for the hoisted expression, and the saved value is used when the subexpression is subsequently encountered. In this way, the subexpression is computed once for each row, and that computed value is reused when the same subexpression is encountered again. In some instances, the computed value is stored in a register of the CPU(s) 202. In some implementations, the compiler 242 and/or the optimizer 244 store data structures, such as hash maps and lists of the dependencies between query operators 228 in the memory 214, to support or guide the optimization passes;

the database engine 120 includes a query execution module 250, which executes the code 230 (sometimes called a query execution plan) generated by the query compiler 242. In some implementations, the query execution module 250 includes a logical-query cache 258, which caches results of query execution. In some implementations, the caching logic leverages query pipeline algorithms. In some implementations, eviction is determined by a "cost" model. All else equal, some implementations evict queries that are cheaper to execute. Prior to executing queries, the logical query-cache 258 is checked to determine if results are available for a pending query. If the results are cached, the cached results are returned (instead of executing the query). Some implementations also reorder queries so as to maximize cache hit rate. An example of how ordering makes a difference to cache hit rate is described above, according to some implementations. Some implementations determine when reordering would be useful as follows. The query pipeline has a block box utility that can be used for containment. Some implementations determine if one query's result can be computed from the cached result of another query, and build a dependency ordering based on the determination; and the database engine 120 also includes a query memory manager 252, which tracks memory utilization by each of the processes, and dynamically allocates memory as needed. In some implementations, the memory manager 252 detects when there is insufficient memory while executing the compiled code. In some implementations, the query memory manager 252 communicates with the query execution module 250.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 214 stores a subset of the modules and data structures identified above. Furthermore, in some implementations, the memory 214 stores additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Standard relational database query engines rely on relational algebra trees (e.g., an operator tree 228) for evaluating logically optimized plans. A typical algebra tree 228 has the nice property that its leaves correspond to base relations and each node in the tree 228 can be evaluated based solely on nodes of its subtree. To evaluate a node in the tree, a typical "iterator engine" works by pulling intermediate results from the subtrees corresponding to children of the node.

Some database engines choose access paths as part of the logical optimization. The existence of an index on a joined column can enable the usage of index-nested loop joins and thereby influences the optimality of different join orders. Because of this, access paths are typically chosen as part of join reordering. Next, the database engine chooses a physical implementation for each of the algebraic operators in the operator tree. In some implementations, during this phase, the database engine also chooses the appropriate access path and indices to retrieve the requested data as fast as possible. The optimized operator tree is compiled to native machine code, according to some implementations. This compiled code is then loaded and linked with the database engine at runtime and executed. Thus, in some implementations, the database engine functions essentially as an optimizing JIT compiler for database queries.

In some implementations, in order to enable efficient code generation, implementations use a produce-consume execution model. In this execution model, the code for all operators is fused together, enabling the system to push one tuple at a time through the whole operator tree up to the next pipeline breaker.

In some implementations, the database engine uses "Morsel-driven parallelism." In this parallelization model, work is dynamically balanced between worker threads. Tuples are handed out to the worker threads in so-called morsels, which are chunks of a few thousand tuples. Worker threads take thread-locality into account when picking up morsels for processing.

In some implementations, the database engine's optimizer and query engine are decoupled from the database storage layer. This enables the database engine to work on a large set of different storage formats.

Some implementations of the interactive data visualization application 222 use a data visualization user interface to build a visual specification. The visual specification identifies one or more data sources, which may be stored locally (e.g., on the same device that is displaying the user interface) or may be stored externally (e.g., on the database server 106 or in the cloud). The visual specification also includes visual variables. The visual variables specify characteristics of the desired data visualization indirectly according to selected data fields from the data sources. In particular, a user assigns zero or more data fields to each of the visual variables, and the values of the data fields determine the data visualization that will be displayed.

In most instances, not all of the visual variables are used. In some instances, some of the visual variables have two or more assigned data fields. In this scenario, the order of the assigned data fields for the visual variable (e.g., the order in which the data fields were assigned to the visual variable by the user) typically affects how the data visualization is generated and displayed.

Some implementations use an object model 108 (sometimes called a data model) to build the appropriate data visualizations. In some instances, an object model applies to one data source (e.g., one SQL database or one spreadsheet file), but an object model may encompass two or more data sources. Typically, unrelated data sources have distinct object models. In some instances, the object model closely mimics the data model of the physical data sources (e.g., classes in the object model corresponding to tables in a SQL database). However, in some cases the object model is more normalized (or less normalized) than the physical data sources. An object model groups together attributes (e.g., data fields) that have a one-to-one relationship with each other to form classes, and identifies many-to-one relationships among the classes. The object model also identifies each of the data fields (attributes) as either a dimension or a measure. In the following, the letter "D" (or "d") is used to represent a dimension, whereas the latter "M" (or "m") is used to represent a measure. When an object model 108 is constructed, it can facilitate building data visualizations based on the data fields a user selects. Because a single object model can be used by an unlimited number of other people, building the object model for a data source is commonly delegated to a person who is a relative expert on the data source, As a user adds data fields to the visual specification (e.g., indirectly by using the graphical user interface to place data fields onto shelves), the data visualization application 222 groups together the user-selected data fields according to the object model 108. Such groups are called data field sets. In many cases, all of the user-selected data fields are in a single data field set. In some instances, there are two or more data field sets. Each measure m is in exactly one data field set, but each dimension d may be in more than one data field set.

The data visualization application 222 queries the data sources for the first data field set, and then generates a first data visualization corresponding to the retrieved data. The first data visualization is constructed according to the visual variables in the visual specification that have assigned data fields from the first data field set. When there is only one data field set, all of the information in the visual specification is used to build the first data visualization. When there are two or more data field sets, the first data visualization is based on a first visual sub-specification consisting of all information relevant to the first data field set. For example, suppose the original visual specification includes a filter that uses a data field f. If the field f is included in the first data field set, the filter is part of the first visual sub-specification, and thus used to generate the first data visualization.

When there is a second (or subsequent) data field set, the data visualization application 222 queries the data sources for the second (or subsequent) data field set, and then generates the second (or subsequent) data visualization 124 corresponding to the retrieved data. This data visualization is constructed according to the visual variables in the visual specification that have assigned data fields from the second (or subsequent) data field set.

Overview of Object Model Query Optimization Using Query Fusion

Figure 3:
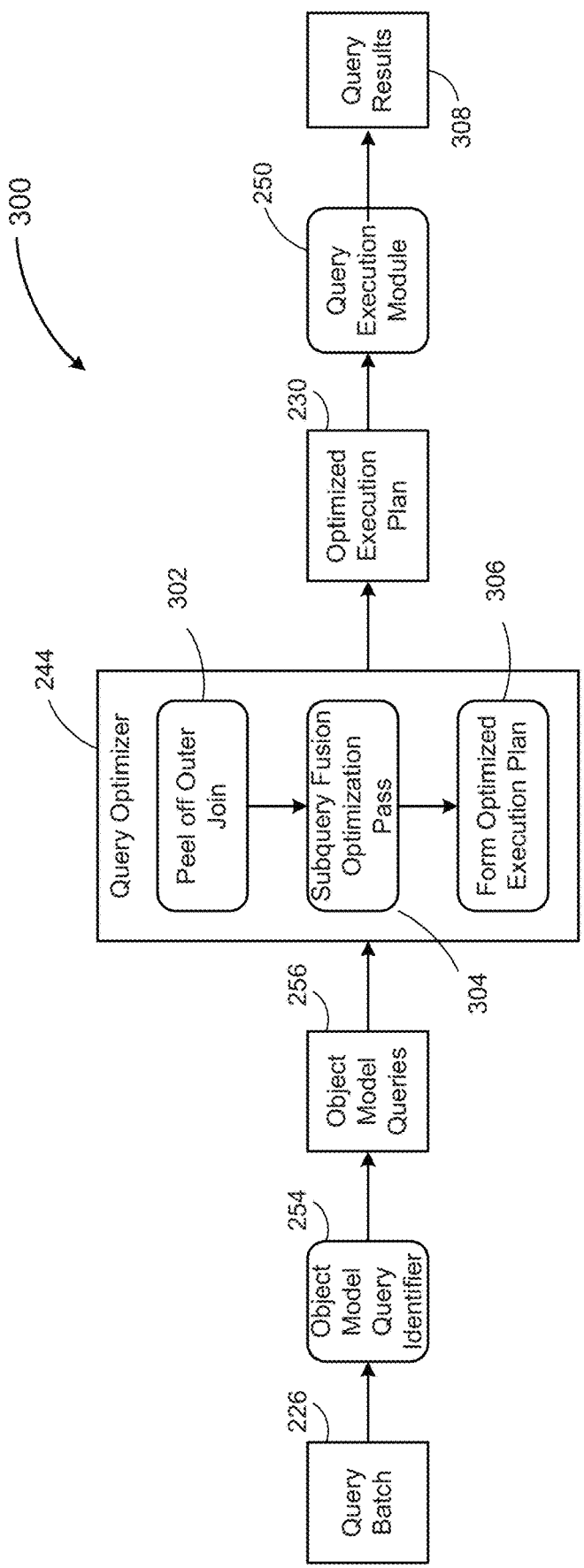
FIG. 3 is a block diagram of a process for optimizing object model queries in query batches using query fusion, in accordance with some implementations.
Figure 4A:
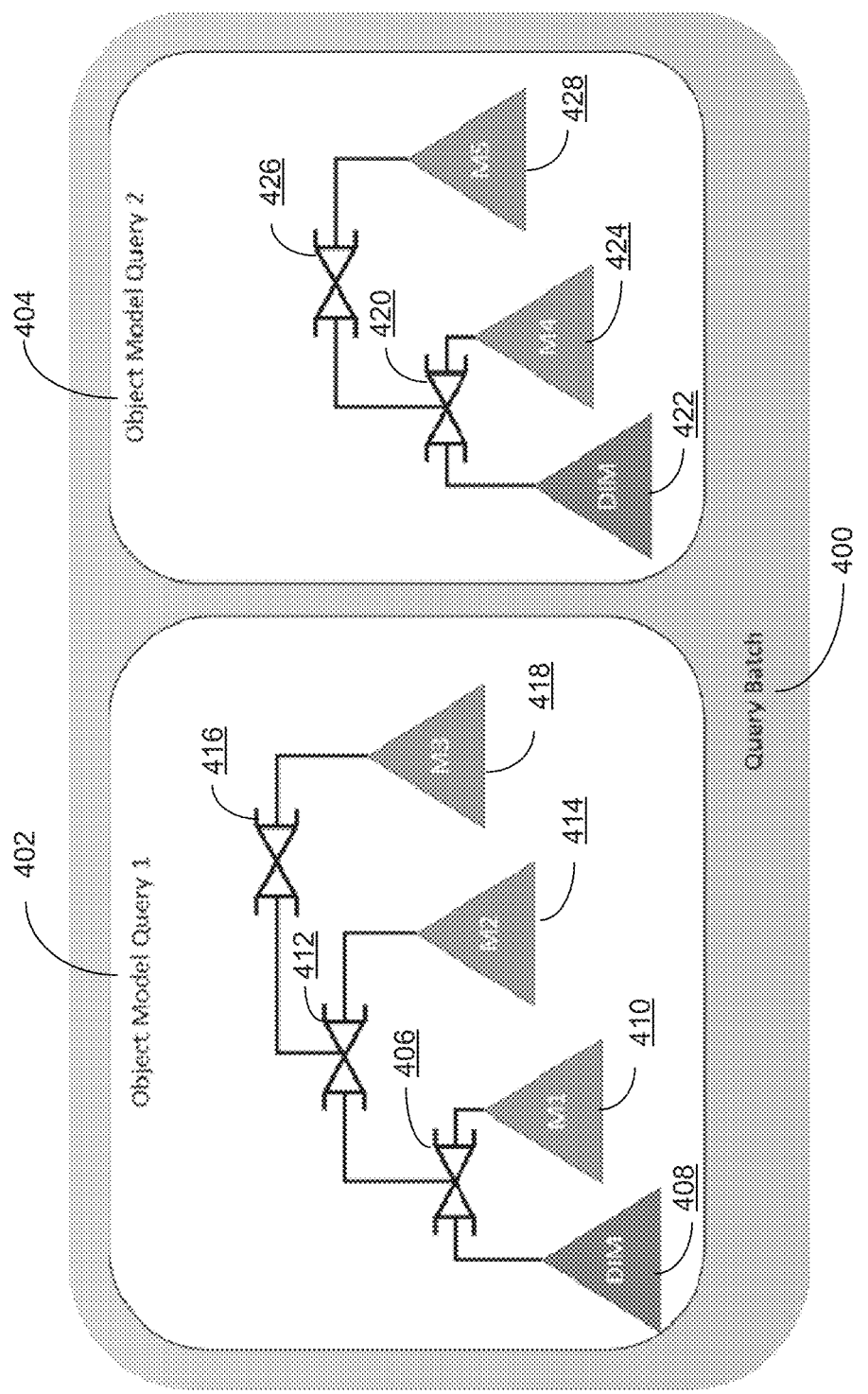
FIG. 4A shows an example query batch that includes two object model queries, according to some implementations.

FIG. 3 is a block diagram of a process 300 for optimizing object model queries in query batches using query fusion, in accordance with some implementations. The process 300 is described in reference to the examples shown in FIGS. 4A-4D, for ease of explanation. Some implementations receive a query batch 226 (e.g., from the server 104 or the client device 102). FIG. 4A shows an example query batch 400 that includes two object model queries 402 and 404. The first object model query 402 includes a dimension subquery (DIM) 408 joined (406) to a first aggregated measure subquery (M1) 410, which is in turn joined (412) to a second aggregate measure subquery (M2) 414, which is subsequently joined (416) to a third aggregate measure subquery (M3) 418. The second object model query 404 includes a dimension subquery (DIM) 422 joined (420) to a fourth aggregate measure subquery (M4) 424, which is in turn joined (426) to a fifth aggregate measure subquery (M5) 428.

Some implementations identify (e.g., using the object model query identifier 254) object model (SQL) queries 256 from a batch of queries. For the example shown in FIG. 4A, the object model query identifier 254 identifies the queries 402 and 404 as object model queries by identifying (or recognizing) the outer-most outer-joins 406 and 420, the dimension subqueries 408 and 422, and the aggregate measure subqueries 410, 414, 418, 424, and 428. In FIG. 4A, the "outer-most outer-join" of the object model query includes joins 406, 412, 416, 420, and 426. In other words, the "outer-most outer join" includes the full outer joins and coalesces that stitch together the various subqueries.

In some implementations, the query optimizer 244 (or an optimization pass therein) processes the object model queries 256. For each object model query, the query optimizer 244 peels off (302) the outer-most outer-joins that stitch or join together dimension and measure subqueries. For the example shown in FIG. 4B, peeling off the joins 416, 412, and 406 for the first object model query 402 results in the dimension subquery 408 and the aggregate measure subqueries 410, 414, and 418. Similarly, peeling off the joins 426 and 420 from the second object model query 404 results in the dimension subquery 422, and the aggregate measure subqueries 424 and 428.

Figure 4B:
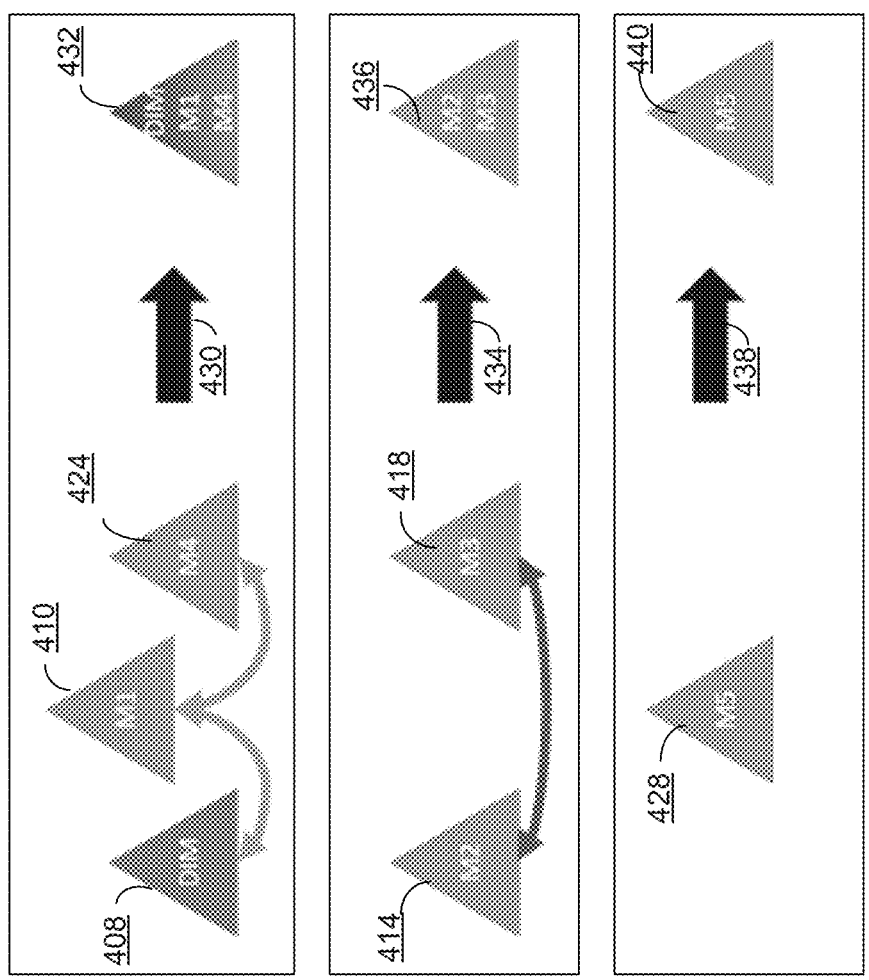
FIG. 4B shows the process of query fusion for the subqueries identified in FIG. 4A, according to some implementations.

Some implementations apply subquery fusion (304) where possible to these subqueries across the query batch. FIG. 4B shows the process of query fusion for the subqueries identified in FIG. 4A, according to some implementations. In particular, some implementations identify that the two dimension subqueries 408 and 422 are equivalent, so it only needs to be executed one time. In this example, the first and fourth subqueries 410 and 424 aggregate measures from the same database object as the dimension subquery 408, so the dimension subquery 408 is fused (430) with the aggregate measure subqueries 410 and 424 to obtain an optimized subquery 432. Similarly, the second and third subqueries 414 and 418 aggregate measures from the same database object (but a different object from the first and fourth subqueries 410 and 424), so the aggregate measure subqueries 414 and 418 are fused (434) to obtain an optimized subquery 436. The fifth aggregate measure subquery 428 is not fused with any other subquery, but an optimized subquery 440 may be generated (438) by restructuring the fifth subquery 428.

Figure 4C:
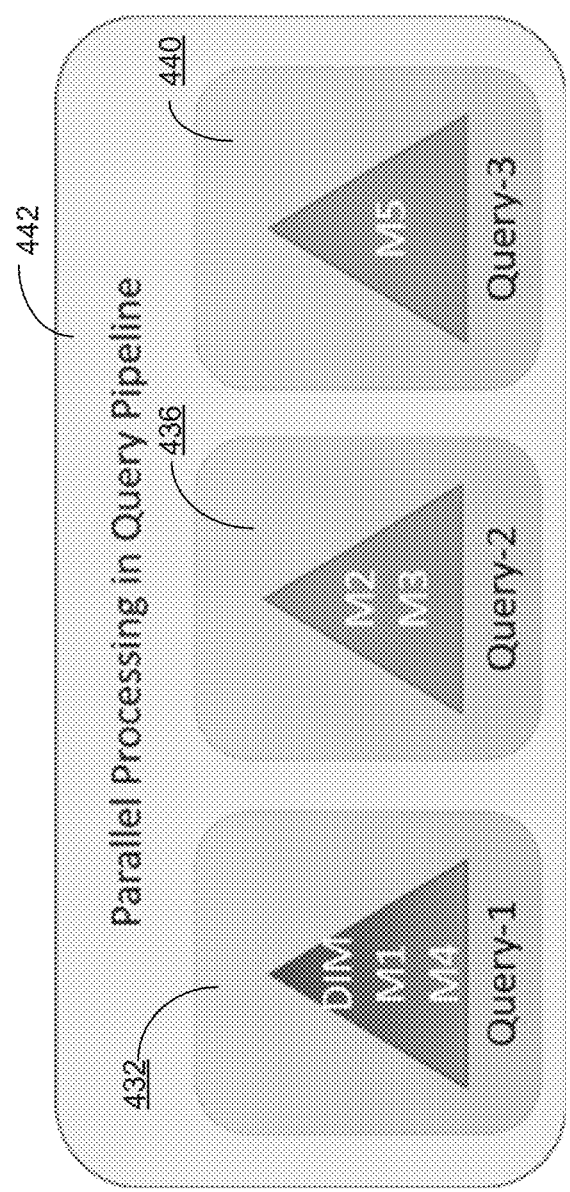
FIG. 4C shows parallel processing of subqueries, according to some implementations.

Some implementations process the fused subqueries (e.g., the subqueries 432, 436, and 440) using parallel processing in a query pipeline 442, as shown in FIG. 4C.

Figure 4D:
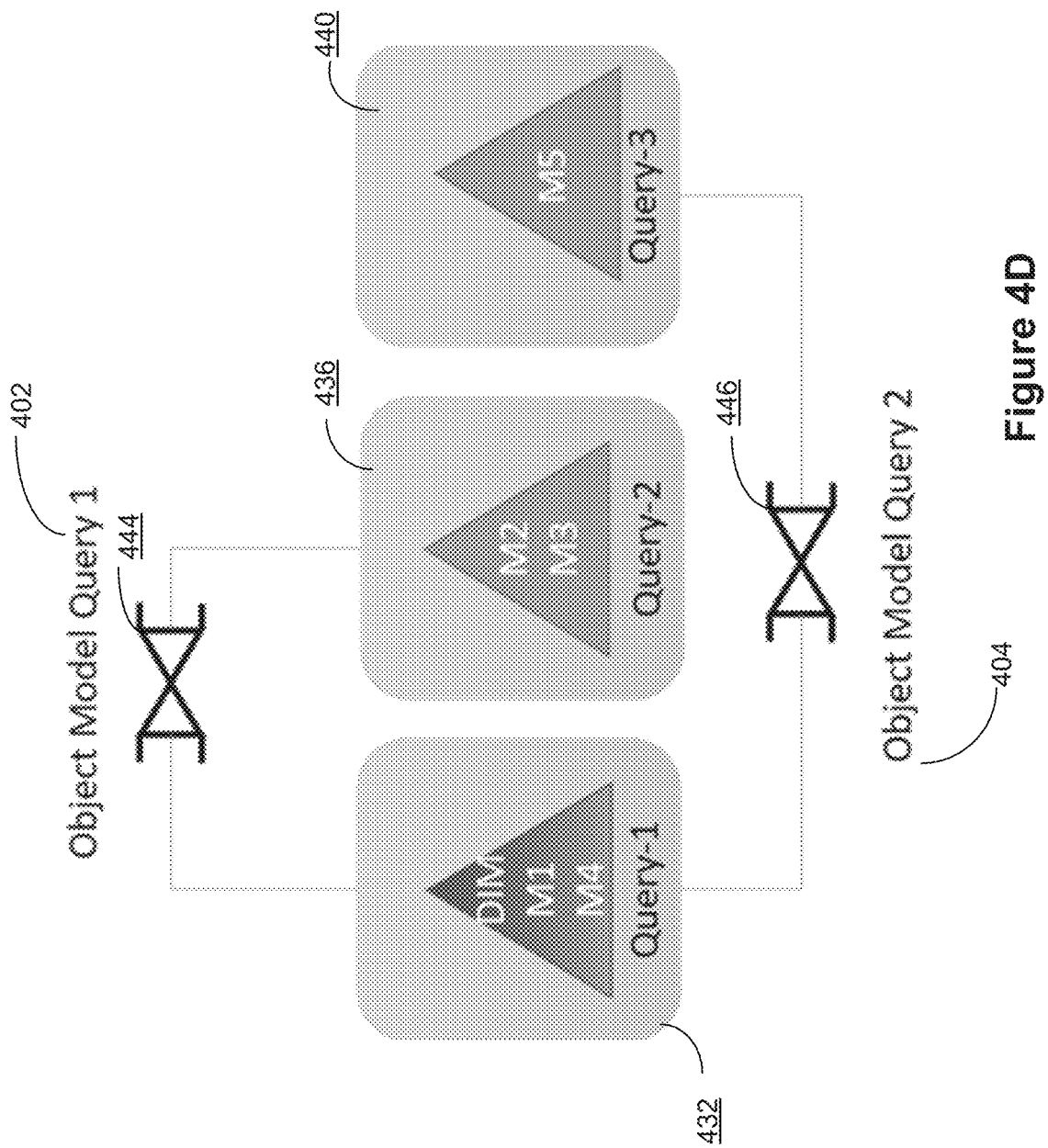
FIG. 4D shows an example formation of optimized execution plans based on optimized subqueries, according to some implementations.

Some implementations form (306) optimized execution plans 230 based on the optimized subqueries from the subquery optimization pass 304. Some implementations reapply outer-joins to satisfy the original object model queries. As shown in FIG. 4D, some implementations generate an outer join 444 that joins the fused or optimized subquery 432 with the optimized subquery 436, and an outer join 446 that joins the optimized subqueries 432 and 440, to correspond to the original object model queries 402 and 404.

In some implementations, the query execution module 250 executes the optimized execution plan 230 to produce query results 308. In some implementations, the query execution module 250 uses the logical-query cache 258 to cache results of query execution. If there is a cache hit, the query execution module retrieves the results from the logical-query cache 258, instead of executing the optimized query. In some implementations, the cache is owned by a query pipeline algorithms. One layer of caching is based on the intermediate logical query representation (whereby equality and/or hashing are defined). In some implementations, the cache 258 is indexed by query hashes. Some implementations perform rewriting or normalization of queries in order to get better hit rates. In some implementations, another layer of caching is based on the final SQL test.

Example Application of Query Fusion to Optimize Object Model Queries

FIGS. 5A and 5B show example object model queries that are optimized according to the techniques described above in reference to FIGS. 3 and 4A-4D. FIG. 5A shows an example query batch 500 that includes two object model queries, a first query 502 for [Ship Mode] ⋈ SUM([Sales]) and a second query 504 for [Ship Mode] ⋈ SUM([Profit]). Each query has two subqueries, for a total of four subqueries. The first query 502 includes two subqueries 506 and 508, and the second query 504 includes two subqueries 510 and 512.

Some implementations apply query fusion to the set of four subqueries shown in the table in FIG. 5A to obtain two subqueries shown in the table in FIG. 5B. In particular, the subquery 514 is obtained by recognizing that the two identical [Ship Mode] queries (in the original sub-queries 506 and 510) can be fused together. The subquery 516 is obtained by recognizing that the two aggregate measures (in the original subqueries 508 and 512) are at the same level of detail from the same table (LineItems table), and fusing the two aggregate measures into the single subquery 516.

For this example, the two original object model queries 502 and 504 can be satisfied by the same outer-joined query: [Ship mode] ⋈ (SUM([Sales])⊕SUM([Profit])). Some implementations will obtain results for this twice, one for each requested query.

Additional Optimizations

Some implementations perform further optimizations after isolating the subqueries. Some implementations rewrite subqueries to canonical form. Some implementations apply a number of rewrites to logical queries that are designed to transform semantically identical but structural distinct queries into a normalized form. By applying these transformations, some implementations increase the opportunity to increase query-cache (sometimes called logical-query cache) hits. Some optimizations strip off top-level renames. This is an additional normalization technique used to improve the probability of cache hits. Some implementations perform a cache-entry check. Some implementations ensure that a logical-query cache is checked for subquery results prior to actually running the subquery remotely. Some implementations perform cache based ordering containment. Some implementations order queries so as to increase reuse of cached results from a query batch. Some implementations satisfy or fetch results for subqueries in a batch by using the cached results of other subqueries in a batch. For instance, "SUM([Population])" can be obtained from the result of "[State]×SUM([Population])" (assuming [State] and [Population] come from the same object). Some implementations order the execution of subqueries to take advantage of this property.

FIGS. 6A-6K show a flowchart of a method 600 for optimizing object model queries in query batches using query fusion, according to some implementations. The method is performed at the database engine 120 having one or more computing devices, each having one or more processors 202 and memory 214. The memory stores one or more programs configured for execution by the one or more processors. The one or more programs execute to retrieve data from a database (e.g., an SQL database).

In some implementations, the database engine is part of a system that also includes a data visualization engine (e.g., combining the functionality of the database server 106 and the data visualization server 104 in FIG. 1). In some implementations, a query batch is generated as part of building a data visualization.

In some implementations, the data visualization engine receives (660) a visual specification, which specifies a data source, a plurality of visual variables, and a plurality of data fields from the data source. Each of the visual variables is associated (660) with either (i) a respective one or more of the data fields or (ii) one or more filters, and each of the data fields is identified as either a dimension or a measure. The data visualization application obtains (662) an object model encoding the data source as a tree of logical tables. Each logical table has (662) its own physical representation and includes a respective one or more logical fields. Each logical field corresponds to (662) either a data field or a calculation that spans one or more logical tables. Each edge of the tree connects (662) two logical tables that are related. The data visualization engine forms (664) a respective dimension subquery based on logical tables that supply the data fields for the dimensions and the filters. The data visualization application then forms (666), for each measure, based on the logical tables that supply the data fields for the respective measure and the filters, a respective aggregated measure subquery grouped by the dimensions. The data visualization engine then forms (668) one or more object model queries of a query batch each using a respective outer-most outer-join, that joins, using the dimensions, the respective dimension subquery to the respective aggregated measure subqueries.

The database engine 120 receives (602) a query batch 226 of database queries from a client (e.g., as generated by the data visualization engine).

The database engine 120 identifies (604) one or more object model queries 256 from the query batch. Each object model query includes (604) a respective outer-most outer-join that joins a respective dimension subquery and respective aggregated measure subqueries. Referring next to FIG. 6J, in some implementations, the database engine 120 identifies (604) each object model query by identifying (654) a respective outer-most outer-join that joins a respective dimension subquery and respective aggregated measure subqueries. Referring next to FIG. 6K, in some implementations, the database engine 120 identifies (604) each object model query by parsing (656) a database query to build a query operator tree that includes one or more query operators that reference objects of the database, and identifying (658) an outer-most outer-join, from the one or more query operators, that joins a dimension subquery and aggregated measure subqueries.

Figure 6A:
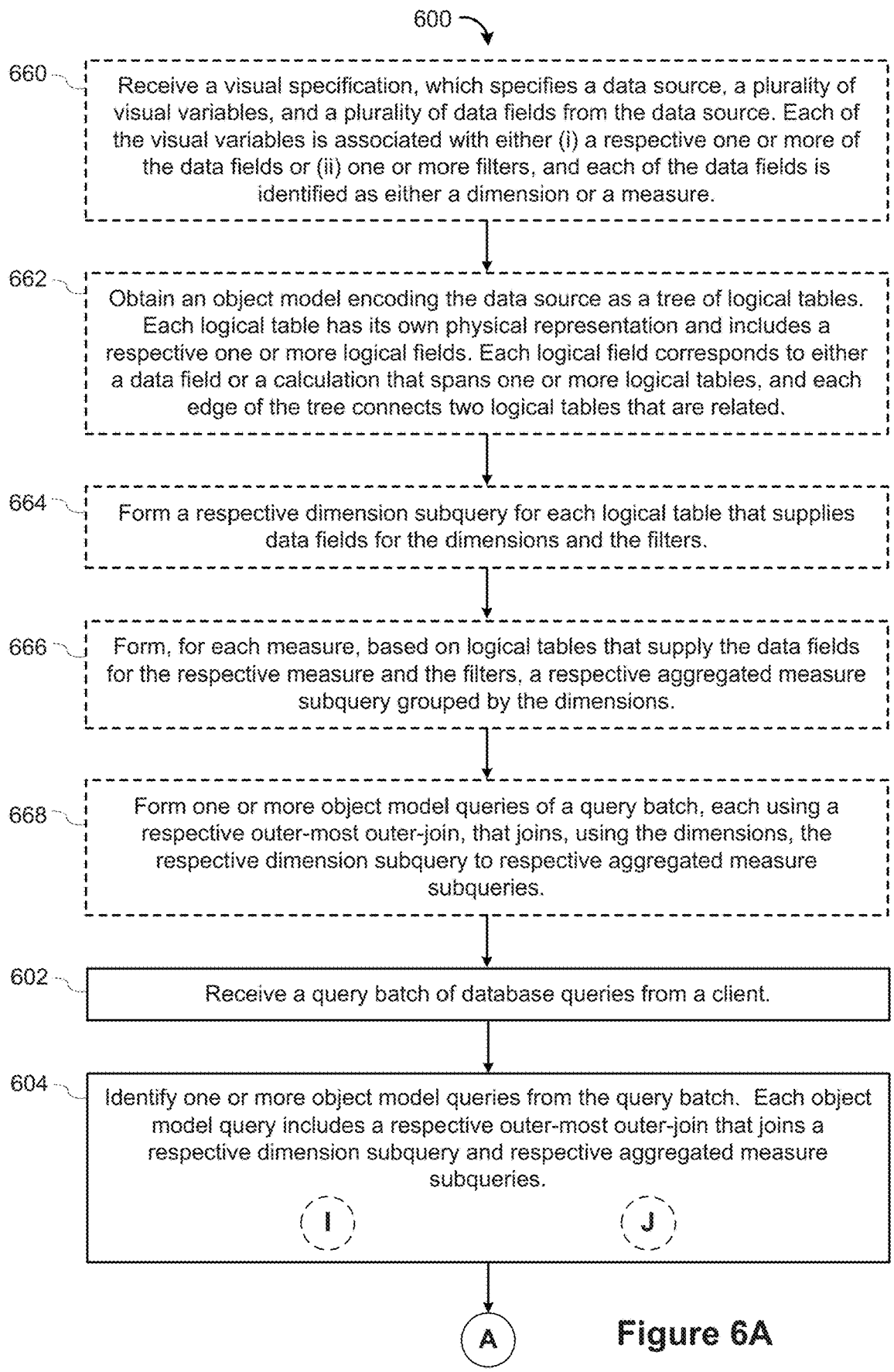
Figure 6B:
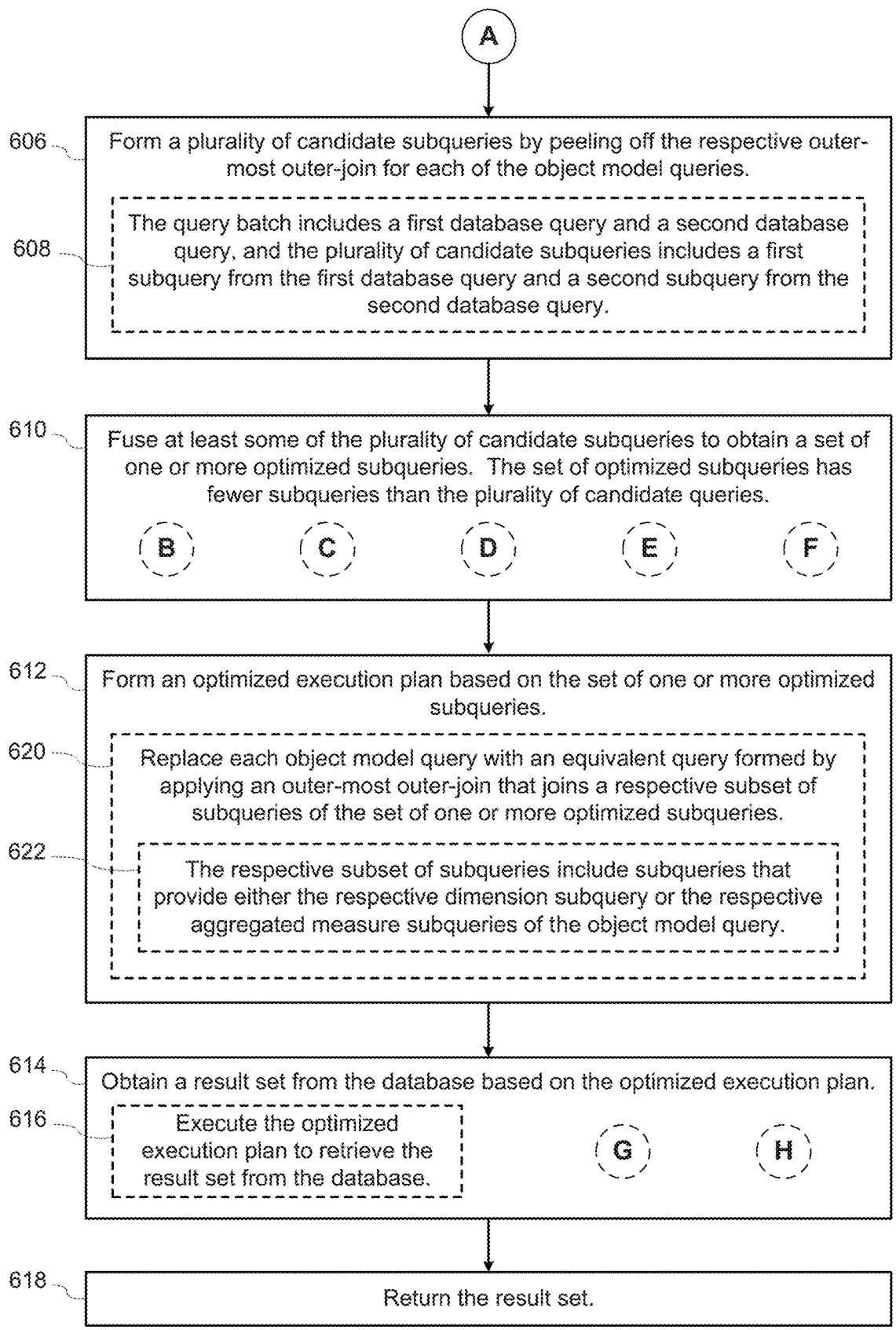

Referring now back to FIG. 6B, for each object model query, the database engine 120 peels off (606) outer-most outer-join that joins a respective dimension subquery and respective aggregated measure subqueries, thereby forming a plurality of candidate subqueries. In some instances, the query batch includes (608) a first database query (e.g., the first query 502 in FIG. 5A) and a second database query (e.g., the second query 504 in FIG. 5A), and the plurality of candidate subqueries includes (608) a first subquery (the first subquery 506 in FIG. 5A) from the first database query and a second subquery (e.g., the third subquery 510 in FIG. 5A) from the second database query.

Figure 6E:
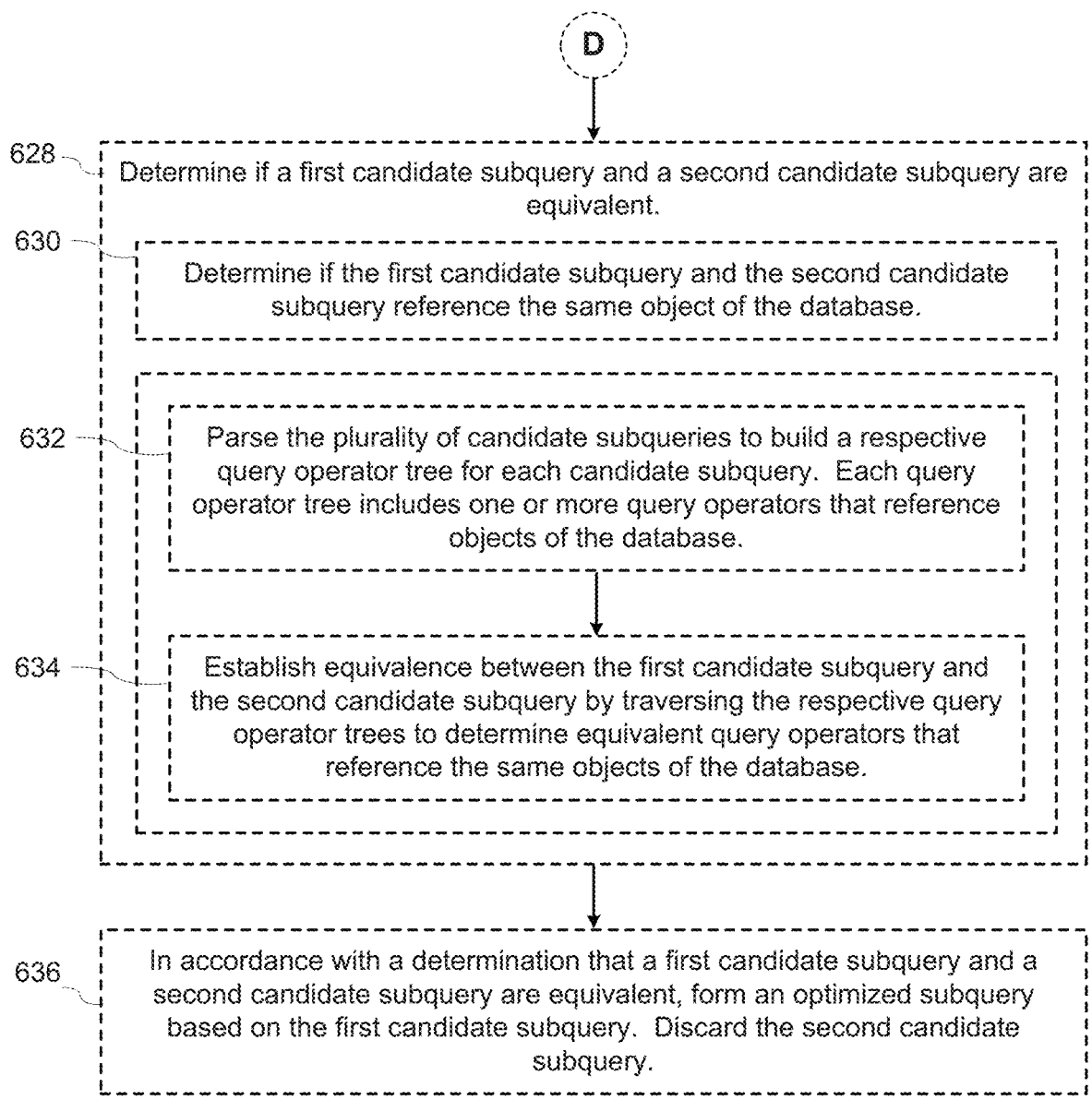

The database engine 120 fuses (610) at least some of the plurality of candidate subqueries to obtain a set of one or more optimized subqueries. The set of optimized subqueries has (610) fewer subqueries than the plurality of candidate queries. Referring next to FIG. 6E, in some implementations, fusing (610) at least some of the plurality of candidate subqueries comprises determining (628) if a first candidate subquery and a second candidate subquery are equivalent. In some implementations, determining if the first candidate subquery and the second candidate subquery are equivalent comprises determining (630) if the first candidate subquery and the second candidate subquery reference the same object of the database. In some implementations, determining if the first candidate subquery and the second candidate subquery are equivalent comprises parsing (632) the plurality of candidate subqueries to build a respective query operator tree for each candidate subquery (each query operator tree includes one or more query operators that reference objects of the database) and establishing (634) equivalence between the first candidate subquery and the second candidate subquery by traversing the respective query operator trees to determine equivalent query operators that reference the same objects of the database. When a first candidate subquery and a second candidate subquery are equivalent, the database engine 120 forms (636) an optimized subquery based on the first candidate subquery. The second candidate subquery is then typically discarded.

Referring back to FIG. 6C, in some implementations, fusing (610) at least some of the plurality of candidate subqueries comprises, when a first candidate subquery and a second candidate subquery are aggregated measure subqueries at the same level of detail from a first object of the database, forming (624) an optimized subquery based on the first candidate subquery and adding references to columns of the first object from the second candidate subquery. The second candidate subquery is then typically discarded.

Referring next to FIG. 6D, in some implementations, fusing (610) at least some of the plurality of candidate subqueries comprises combining (626) groups of queries defined over the same relation and potentially different with respect to their top-level projection lists. For example, suppose a query batch includes a group of queries of the form $[\pi_{P1}(R), \ldots, \pi_{Pn}(R)]$. Some implementations replace the queries with a single query $\pi_P(R)$, where R is the common relation. Here, P1, . . . , Pn are respective projection lists for the object model queries. For example, given a set of subqueries of an object model query, a relation is the query tree. A projection is a top-level rename, such as the "AS Total" in the query "SELECT SUM(Sales) AS Total from Table . . . ". The relation may be the table plus the filters.

Figure 6F:
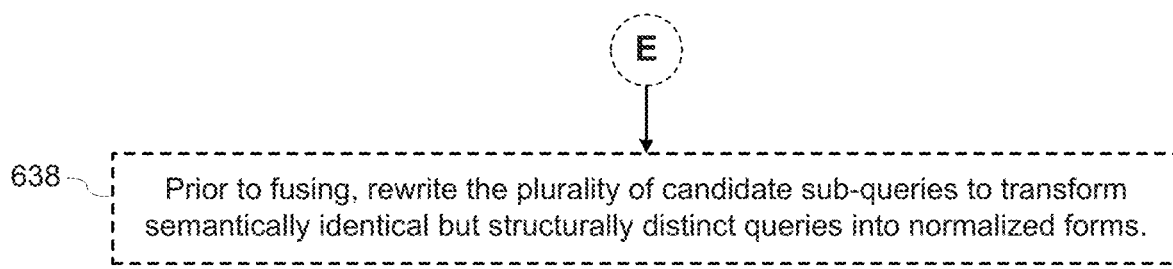

Referring next to FIG. 6F, in some implementations, prior to performing the fusing operation (610), the database engine 120 rewrites (638) the plurality of candidate subqueries to transform semantically identical but structurally distinct queries into normalized forms. Some implementations identify "semantically identical by structurally distinct queries" and what specific actions are taken to normalize the queries as follows. The normalization steps are described above. The goal of the normalization is to map queries to a canonical form. For instance, the first query query "SELECT IFNULL([Field], "FOO") AS [Field] FROM Table" can be rewritten to "SELECT [Field] FROM Table" after detecting that [Field] is never null. Likewise, the second query "SELECT [Field] FROM Table GROUP BY [Field]" can be written to SELECT [Field] FROM Table" if it is detected that [Field] is a PK (primary key) of the Table. This example includes two very different queries but the system generates the same end query.

Figure 6G:
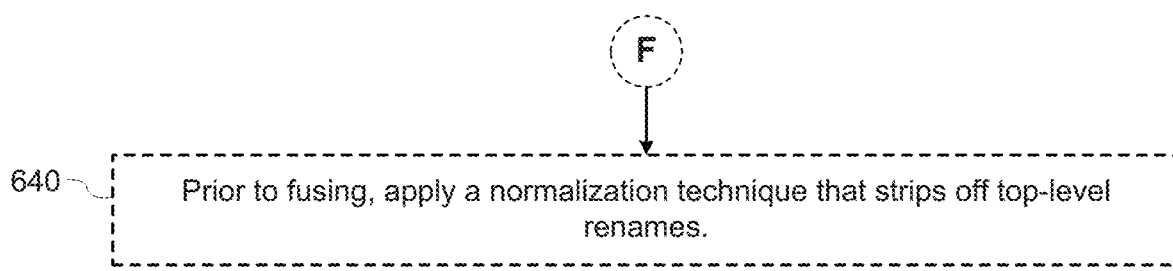

Referring next to FIG. 6G, in some implementations, prior to performing the fusing operation (610), the database engine applies (640) a normalization technique that strips off top-level renames. Top-level renames are described above, according to some implementations. A query may include a top-level rename if the original queries use aliases for the same fields or if two queries have different naming schemes (e.g., the two queries are from different sheets on a single data visualization dashboard).

Referring now back to FIG. 6B, the database engine 120 also forms (612) an optimized execution plan based on the set of one or more optimized subqueries. In some implementations, the database engine 120 forms (612) the optimized execution plan by replacing each object model query with an equivalent query formed by applying (620) an outer-most outer-join that joins a respective subset of subqueries of the set of one or more optimized subqueries. The respective subset of subqueries include (622) subqueries that provide either the respective dimension subquery or the respective aggregated measure subqueries of the object model query.

Figure 6H:
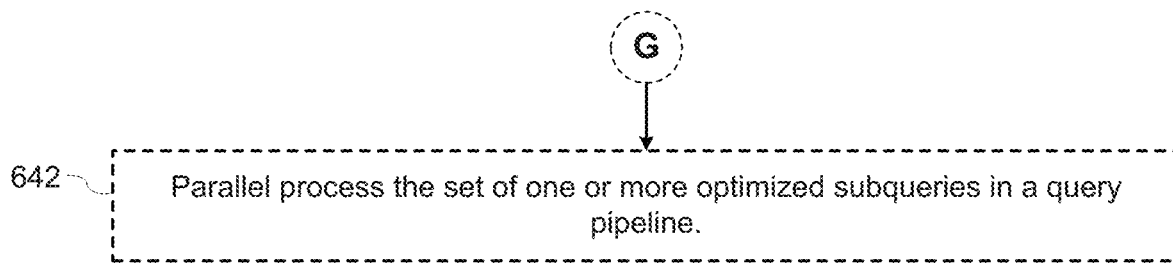

Referring now back to FIG. 6B, the database engine 120 subsequently obtains (614) a result set from the database based on the optimized execution plan, and returns (618) the result set to the client. In some implementations, the database engine 120 obtains the result set from the database by executing (616) the optimized execution plan to retrieve the result set from the database. Referring next to FIG. 6H, in some implementations, the database engine 120 parallel processes (642) the set of one or more optimized subqueries in a query pipeline, as illustrated in FIG. 4C.

Figure 6I:
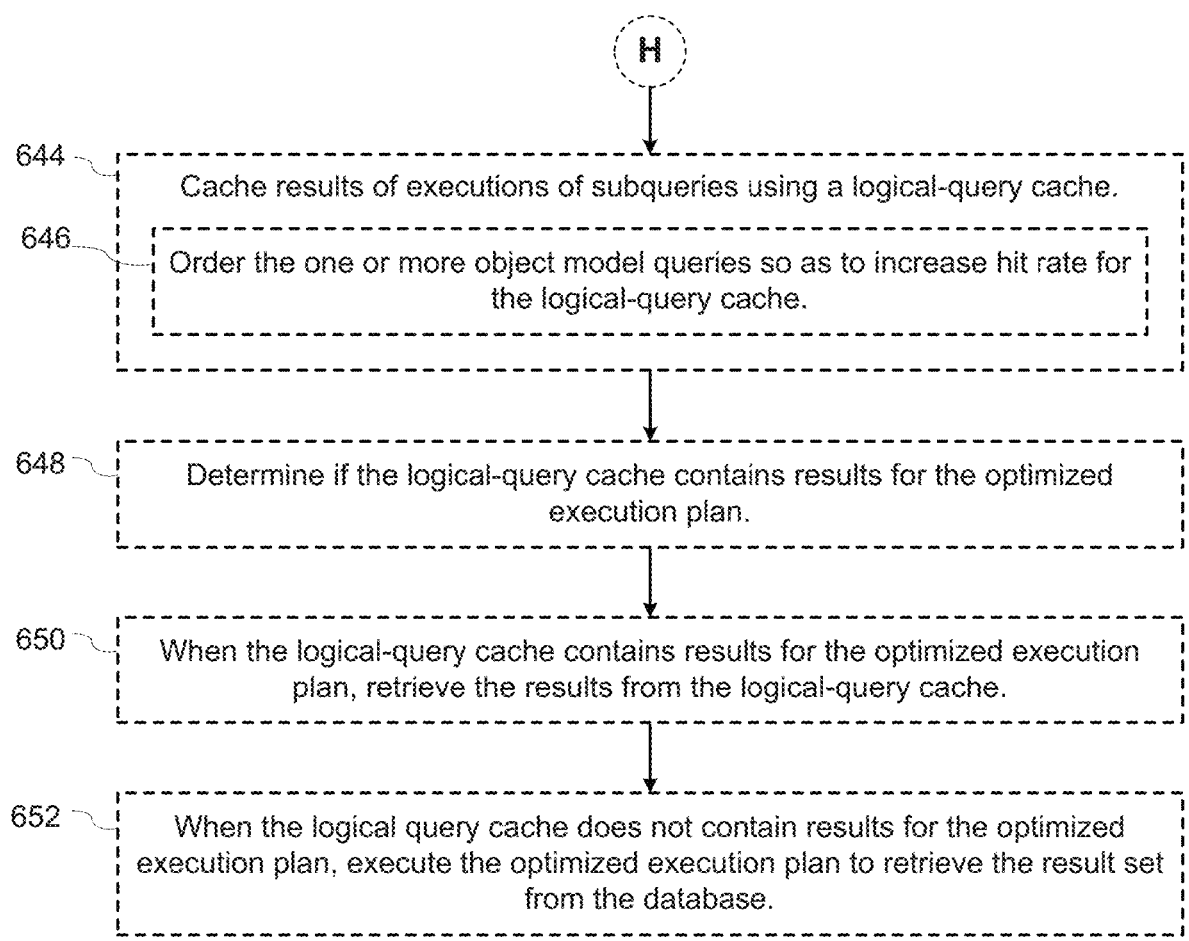
Figure 6J:
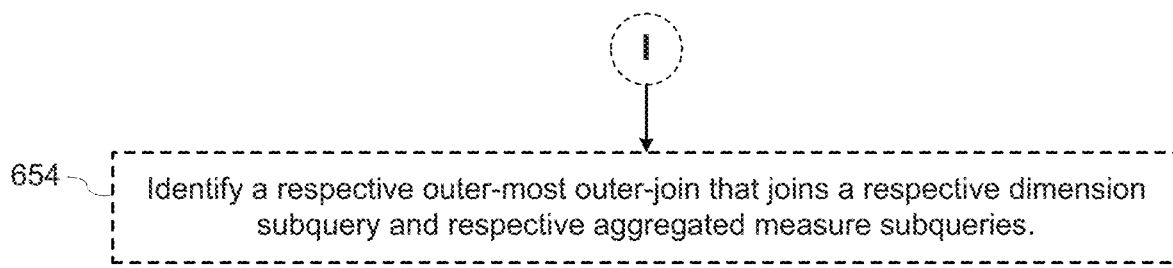
Figure 6K:
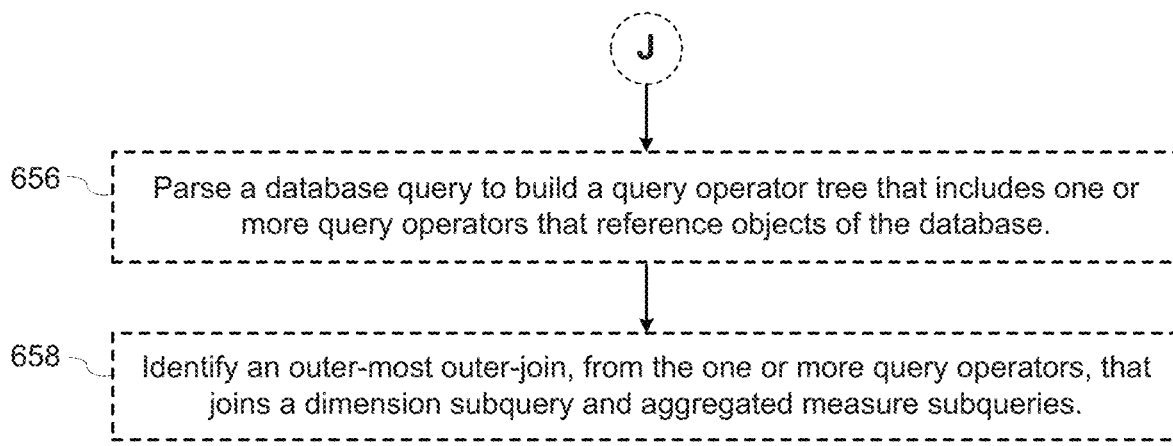

Referring next to FIG. 6I, in some implementations, the database engine 120 caches (644) results of executions of subqueries using a logical-query cache 258. In some implementations, the database engine 120 orders (646) the one or more object model queries so as to increase hit rate for the logical-query cache 258. The database engine 120 obtains the result set from the database by determining (648) if the logical-query cache 258 contains results for the optimized execution plan (e.g., cached results for one or more subqueries). When the logical-query cache 258 contains results for the optimized execution plan, the database engine 120 retrieves (650) the results from the logical-query cache. When the logical-query cache 258 does not contain results for the optimized execution plan, the database engine 120 executes (652) the optimized execution plan to retrieve the result set from the database, without retrieving results from the cache. Some implementations always check the cache for an entry. Some implementations handle edge cases, such as queries with NOW( ) or user references (e.g., USER-NAME( )). In some implementations, the cache lookup is performed on the fly, rather than being built into the execution plan.

In this way, the techniques disclosed herein help reduce the number of queries, thereby decreasing overall overhead of dispatching queries in corresponding data sources and necessary communication. Since it is quite common for different zones of a data visualization dashboard to share the same filters but request different columns, the generated object model queries frequently satisfy the requirements for applying query fusion as described. Processing of a fused query is often much more efficient than processing of the individual queries that were fused, as the underlying relation only needs to be computed once. It is noted that the relation is the entire tree, including joins and filters.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A database engine, comprising:
one or more computing devices, each having one or more processors and memory, wherein the memory stores one or more programs configured for execution by the one or more processors and the one or more programs comprise instructions for:
receiving a query batch of database queries from a client;
identifying one or more object model queries from the query batch, each of the one or more object model queries comprising an outer-most outer-join that joins a respective dimension subquery and respective aggregated measure subqueries at a respective level of detail;
generating a plurality of candidate subqueries by peeling off the respective outer-most outer-join for each of the one or more object model queries;
fusing two or more of the plurality of candidate subqueries to generate a set of one or more optimized subqueries, wherein the set of one or more optimized subqueries has fewer subqueries than the plurality of candidate queries;
generating an optimized execution plan to be executed on a database based on the set of one or more optimized subqueries;
obtaining a result set from the database based on executing the optimized execution plan; and
returning the result set to the client.

2. The database engine of claim 1, wherein the query batch includes a first database query and a second database query, and the plurality of candidate subqueries includes a first subquery from the first database query and a second subquery from the second database query.

3. The database engine of claim 1, wherein the generating of the optimized execution plan based on the set of one or more optimized subqueries comprises:
replacing each object model query with an equivalent query generated by applying an outer-most outer-join that joins a respective subset of subqueries of the set of one or more optimized subqueries.

4. The database engine of claim 1, wherein the fusing of the two or more of the plurality of candidate subqueries comprises:
determining whether a first candidate subquery and a second candidate subquery are equivalent; and
in accordance with a determination that the first candidate subquery and the second candidate subquery are equivalent, generating an optimized subquery based on the first candidate subquery and discarding the second candidate subquery.

5. The database engine of claim 4, wherein the determining of whether the first candidate subquery and the second candidate subquery are equivalent comprises determining if the first candidate subquery and the second candidate subquery reference a same object of the database.

6. The database engine of claim 4, wherein the determining of whether the first candidate subquery and the second candidate subquery are equivalent comprises:
parsing the plurality of candidate subqueries to build a respective query operator tree for each candidate subquery, wherein each query operator tree includes one or more query operators that reference objects of the database; and establishing equivalence between the first candidate subquery and the second candidate subquery by traversing the respective query operator trees to determine equivalent query operators that reference same objects of the database.

7. The database engine of claim 1, wherein the fusing of the two or more of the plurality of candidate subqueries comprises:
in accordance with a determination that a first candidate subquery and a second candidate subquery are aggregated measure subqueries at a same level of detail from a first object of the database, generating an optimized subquery based on the first candidate subquery and adding references to columns of the first object from the second candidate subquery, and discarding the second candidate query.

8. The database engine of claim 1, wherein the fusing of the two or more of the plurality of candidate subqueries comprises combining groups of queries defined over a same relation and potentially different with respect to top-level projection lists associated with the groups of queries.

9. The database engine of claim 1, wherein the one or more programs further comprise instructions for, prior to the fusing, rewriting the plurality of candidate subqueries to transform semantically identical but structurally distinct queries into normalized forms.

10. The database engine of claim 1, wherein the one or more programs further comprise instructions for, prior to the fusing, applying a normalization technique that strips off top-level renames.

11. The database engine of claim 1, wherein the one or more programs further comprise instructions for caching results of executions of subqueries using a logical-query cache, and wherein the obtaining of the result set from the database comprises:
determining if the logical-query cache contains results for the optimized execution plan;
in accordance with a determination that the logical-query cache contains the results for the optimized execution plan, retrieving the results from the logical-query cache; and
in accordance with a determination that the logical-query cache does not contain the results for the optimized execution plan, executing the optimized execution plan to retrieve the result set from the database.

12. The database engine of claim 11, wherein the one or more programs further comprise instructions for ordering the one or more object model queries so as to increase hit rate for the logical-query cache.

13. The database engine of claim 1, wherein the identifying of each object model query comprises identifying the respective outer-most outer-join that joins the respective dimension subquery and the respective aggregated measure subqueries.

14. The database engine of claim 1, wherein the identifying of each object model query comprises:
parsing a database query from the query batch to build a query operator tree that includes one or more query operators that reference objects of the database; and
identifying the outer-most outer-join, from the one or more query operators, that joins the dimension subquery and the aggregated measure subqueries.

15. The database engine of claim 1, wherein the identifying of each object model query comprises:
receiving a visual specification, which specifies a data source, a plurality of visual variables, and a plurality of data fields from the data source, wherein each of the visual variables is associated with either (i) a respective one or more of the plurality of data fields or (ii) one or more filters, and each of the plurality of data fields is identified as either a dimension or a measure;
obtaining an object model encoding the data source as a tree of logical tables, each logical table having a physical representation and including a respective one or more logical fields, each logical field corresponding to either a data field or a calculation that spans one or more logical tables, wherein each edge of the tree connects two logical tables that are related;
identifying a respective dimension subquery based on logical tables that supply the data fields for the dimensions and the filters;
identifying, for each measure, based on the logical tables that supply the data fields for the respective measure and the filters, a respective aggregated measure subquery grouped by the dimensions; and
identifying the respective outer-most outer-join, that joins, using the dimensions, the respective dimension subquery to the respective aggregated measure subqueries.

16. The database engine of claim 1, wherein the one or more programs comprise instructions for parallel processing the set of one or more optimized subqueries in a query pipeline.

17. A method for optimizing complex database queries, the method comprising:
receiving a query batch of database queries from a client;
identifying one or more object model queries from the query batch, each of the one or more object model queries comprising an outer-most outer-join that joins a respective dimension subquery and respective aggregated measure subqueries at a respective level of detail;
generating a plurality of candidate subqueries by peeling off the respective outer-most outer-join for each of the one or more object model queries;
fusing two or more of the plurality of candidate subqueries to generate a set of one or more optimized subqueries, wherein the set of one or more optimized subqueries has fewer subqueries than the plurality of candidate queries;
generating an optimized execution plan to be executed on a database based on the set of one or more optimized subqueries;
obtaining a result set from the database based on executing the optimized execution plan; and
returning the result set to the client.

18. The method of claim 17, wherein the generating of the optimized execution plan based on the set of one or more optimized subqueries comprises:
replacing each object model query with an equivalent query generated by applying an outer-most outer-join that joins a respective subset of subqueries of the set of one or more optimized subqueries.

19. A non-transitory computer readable storage medium storing one or more programs configured for execution by a computer system having a display, one or more processors, and memory, the one or more programs comprising instructions for:
receiving a query batch of database queries from a client;
identifying one or more object model queries from the query batch, each of the one or more object model queries comprising an outer-most outer-join that joins a respective dimension subquery and respective aggregated measure subqueries at a respective level of detail;

generating a plurality of candidate subqueries by peeling off the respective outer-most outer-join for each of the one or more object model queries;

fusing two or more of the plurality of candidate subqueries to generate a set of one or more optimized subqueries, wherein the set of one or more optimized subqueries has fewer subqueries than the plurality of candidate queries;

generating an optimized execution plan to be executed on a database based on the set of one or more optimized subqueries;

obtaining a result set from the database based on executing the optimized execution plan; and returning the result set to the client.

\* \* \* \* \*